United States Patent
Spithourakis et al.

(10) Patent No.: US 11,861,521 B2
(45) Date of Patent: Jan. 2, 2024

(54) SYSTEM AND METHOD FOR IDENTIFICATION AND VERIFICATION

(71) Applicant: PolyAI Limited, London (GB)

(72) Inventors: Georgios Spithourakis, London (GB); Pawel Franciszek Budzianowski, London (GB); Michal Lis, London (GB); Avishek Mondal, London (GB); Ivan Vulic, London (GB); Nikola Mrksic, London (GB); Eshan Singhal, London (GB); Benjamin Peter Levin, London (GB); Pei-Hao Su, London (GB); Tsung-Hsien Wen, London (GB)

(73) Assignee: PolyAI Limited, London (GB)

( * ) Notice: Subject to any disclaimer, the term of this patent is extended or adjusted under 35 U.S.C. 154(b) by 0 days.

(21) Appl. No.: 17/578,826

(22) Filed: Jan. 19, 2022

(65) Prior Publication Data

US 2023/0196151 A1    Jun. 22, 2023

(30) Foreign Application Priority Data

Dec. 21, 2021    (GR) .............................. 20210100900

(51) Int. Cl.
G06N 7/02    (2006.01)
G10L 17/22    (2013.01)

(52) U.S. Cl.
CPC ................ *G06N 7/02* (2013.01); *G10L 17/22* (2013.01)

(58) Field of Classification Search
CPC .................................. G06N 7/02; G06F 21/31
See application file for complete search history.

(56) References Cited

U.S. PATENT DOCUMENTS

| | | |
|---|---|---|
| 5,897,616 A | 4/1999 | Kanevsky et al. |
| 8,050,909 B2 | 11/2011 | Oh et al. |

(Continued)

FOREIGN PATENT DOCUMENTS

| | | |
|---|---|---|
| CA | 3112331 A1 | 3/2020 |
| CN | 103680503 A | 3/2014 |

(Continued)

OTHER PUBLICATIONS

Radhakrishna, "A novel fuzzy gaussian-based dissimilarity measure for discovering similarity temporal association patterns" (Year: 2018).*

(Continued)

*Primary Examiner* — Ann J Lo
*Assistant Examiner* — Van C Mang
(74) *Attorney, Agent, or Firm* — Pillsbury Winthrop Shaw Pittman LLP

(57) ABSTRACT

A computer-implemented method comprising:
obtaining, by way of an input, input data relating to speech provided by a user;
deriving one or more hypotheses for each of a plurality of user data fields from the input data;
obtaining one or more reference values for each of the plurality of user data fields for each of one or more candidate users;
calculating a score for at least one candidate user of the one or more candidate users, calculating the score comprising:
calculating a plurality of user data field scores comprising, for each of the plurality of user data fields, a respective user data field score using the one or more hypotheses and the one or more reference values for the candidate user for the respective user data field;

(Continued)

performing one or more fuzzy logic operations on the plurality of user data field scores;

using the score for a candidate user of the one or more candidate users to perform a verification or identification process for the user.

19 Claims, 11 Drawing Sheets

(56) References Cited

U.S. PATENT DOCUMENTS

| | | | |
|---|---|---|---|
| 8,503,665 B1 | 8/2013 | Meisel | |
| 8,620,657 B2 | 12/2013 | Farrell et al. | |
| 8,782,421 B2 | 7/2014 | Smithies et al. | |
| 9,245,254 B2 | 1/2016 | Lord et al. | |
| 9,262,612 B2 | 2/2016 | Cheyer | |
| 9,361,891 B1 | 6/2016 | Sykes et al. | |
| 9,767,796 B2 | 9/2017 | Zhang | |
| 9,818,115 B2* | 11/2017 | Tonini | G06Q 20/305 |
| 9,843,668 B2 | 12/2017 | Hodge | |
| 9,928,839 B1 | 3/2018 | Lester et al. | |
| 10,181,322 B2 | 1/2019 | Hakkani-Tur et al. | |
| 10,212,280 B1 | 2/2019 | Mcintosh | |
| 10,347,244 B2 | 7/2019 | Goel et al. | |
| 10,446,143 B2 | 10/2019 | Akbacak et al. | |
| 10,515,640 B2 | 12/2019 | Huang et al. | |
| 10,693,872 B1* | 6/2020 | Larson | G06F 21/31 |
| 2008/0208580 A1 | 8/2008 | Scholl | |
| 2009/0319521 A1 | 12/2009 | Groeneveld et al. | |
| 2010/0106503 A1 | 4/2010 | Farrell et al. | |
| 2010/0268537 A1 | 10/2010 | Al-Telmissani | |
| 2014/0188478 A1 | 7/2014 | Zhang | |
| 2014/0222678 A1 | 8/2014 | Sheets et al. | |
| 2015/0371639 A1 | 12/2015 | Foerster et al. | |
| 2016/0127359 A1 | 5/2016 | Minter et al. | |
| 2018/0060954 A1* | 3/2018 | Yin | G06Q 40/025 |
| 2019/0172111 A1 | 6/2019 | Schoeffler | |
| 2020/0151601 A1 | 5/2020 | Niewczas | |

FOREIGN PATENT DOCUMENTS

| | | |
|---|---|---|
| CN | 104427136 A | 3/2015 |
| DE | 102004014414 A1 | 10/2005 |
| DE | 202017000991 U1 | 6/2017 |
| EP | 2028646 A1 | 2/2009 |
| EP | 2428413 B1 | 3/2013 |
| JP | 2002014695 A | 1/2002 |
| JP | 2003323197 A | 11/2003 |
| JP | 2009181183 A | 8/2009 |
| JP | 2020027379 A | 2/2020 |
| KR | 102190856 B1 | 12/2020 |
| WO | 2005119653 A1 | 12/2005 |
| WO | 2015005948 A1 | 1/2015 |
| WO | 2019123775 A1 | 6/2019 |

OTHER PUBLICATIONS

Miguel Raggi, "An application of fuzzy logic to build ecological sympatry networks" (Year: 2019).*

George Suciu "Towards a Continuous Speech Corpus for Banking Domain Automatic Speech Recognition" (Year: 2017).*

Lawrence O'Gorman, "Comparing Passwords, Tokens, and Biometrics for User Authentication", IEEE, 2003 (Year: 2003).*

Gustavo Hernandez-Abrego, "Contextual Confidence Measures for Continuous Speech Recognition", 2000 (Year: 2000).*

Braz, Christina et al.; "Security and Usability: The Case of the User Authentication Methods" IHM 2006, Montreal, Apr. 18-21, 2006; pp. 199-203.

Chung, Grace et al.; "Automatic Acquisition of Names Using Speak and Spell Mode in Spoken Dialogue Systems" HLT-NAACL 2003 Main Papers, Edmonton, May-Jun. 2003; pp. 32-39.

El-Abed, Mohamad et al.; "Evaluation of biometric systems: a study of users' acceptance and satisfaction" International Journal of Biometrics, 2012; pp. 1-26.

Henderson, Matthew et al.; "ConVEx: Data-Efficient and Few-Shot Slot Labeling" arXiv:2010.11791v2 [cs.CL] Jun. 7, 2021; pp. 1-15.

Jain, Anil K. et al.; "An Introduction to Biometric Recognition" IEEE Transactions on Circuits and Systems for Video Technology, vol. 14, No. 1, Jan. 2004; pp. 4-20.

Kaplan, Micaela; "May I Ask Who's Calling? Named Entity Recognition on Call Center Transcripts for Privacy Law Compliance" Proceedings of the 2020 EMNLP Workshop W-NUT: The Sixth Workshop on Noisy User-generated Text, Nov. 19, 2020; pp. 1-6.

Lau, Chun Wai et al.; "Fuzzy Logic Decision Fusion in a Multimodal Biometric System" ICSLP 8th International Conference on Spoken Language Processing, ICC Jeju, Jeju Island, Korea, Oct. 4-8, 2004; pp. 1-4.

O'Gorman, Lawrence et al.; "How to Speak an Authentication Secret Securely from an Eavesdropper" Security Protocols 2006, LNCS 5087; pp. 215-216.

O'Gorman, Lawrence; "Comparing Passwords, Tokens, and Biometrics for User Authentication" Proceedings of the IEEE, vol. 91, No. 12, Dec. 2003; pp. 2019-2040.

Price, Ryan et al.; "A hybrid approach to scalable and robust spoken language understanding in enterprise virtual agents" Proceedings of NAACL HLT 2021: Industry Track Papers, Jun. 6-11, 2021; pp. 63-71.

Variani, Ehsan et al.; "Deep Neural Networks for Small Footprint Text-Dependent Speaker Verification" 2014 IEEE International Conference on Acoustic, Speech and Signal Processing (ICASSP); pp. 4080-4084.

Vertanen, Keith et al.; "Spelling as a Complementary Strategy for Speech Recognition" ISCA's 13th Annual Conference, Portland, OR, USA, Sep. 9-13, 2012; pp. 2294-2297.

Zadrozny, Slawomir et al.; "Fuzzy information retrieval model revisited" Fuzzy Sets and Systems 160 (2009); pp. 2173-2191.

Office Action in International Application No. GB2208281.2, dated Sep. 9, 2022, pp. 1-2.

* cited by examiner

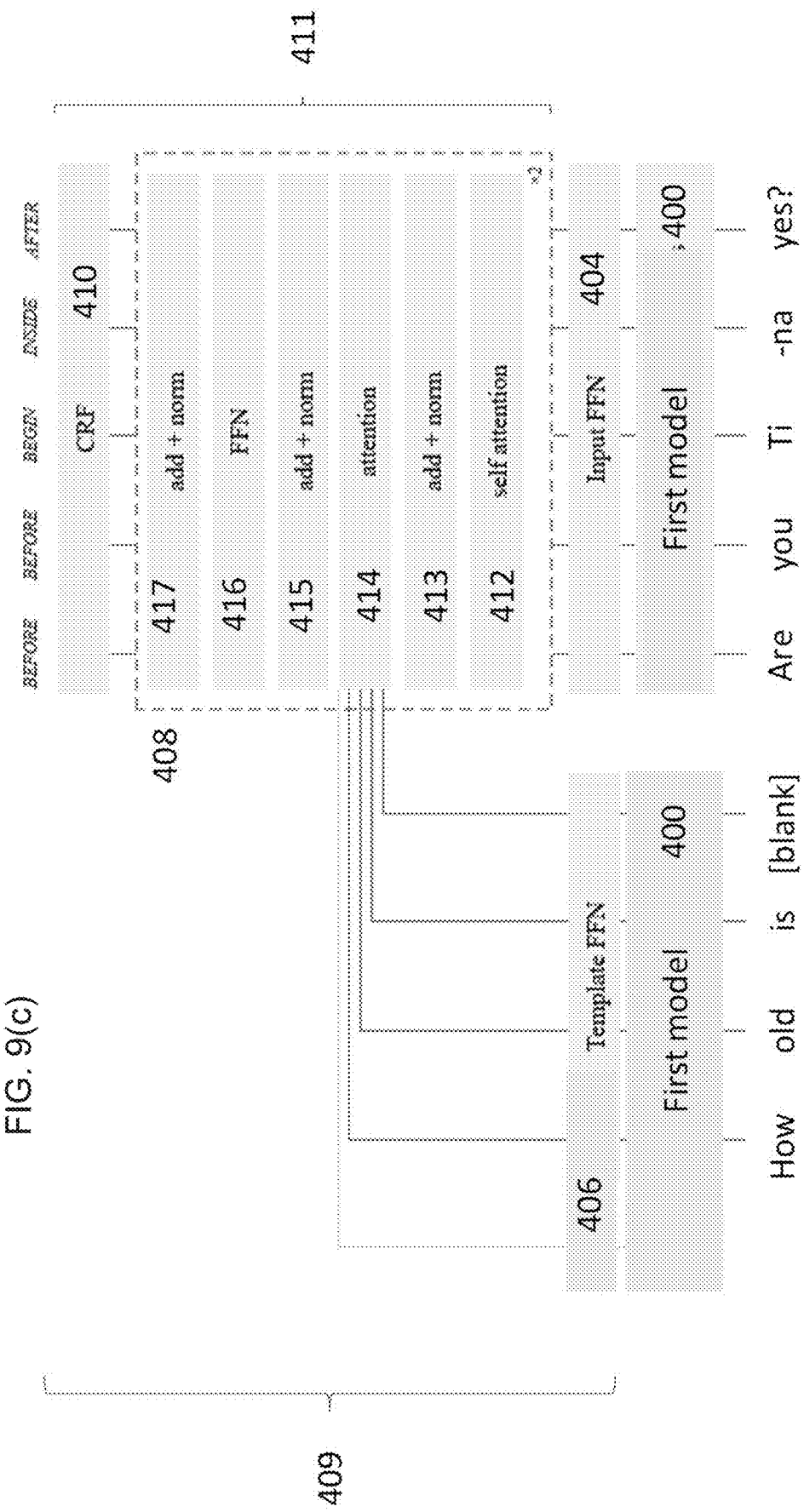

SYSTEM AND METHOD FOR IDENTIFICATION AND VERIFICATION

TECHNICAL FIELD

The present disclosure relates to systems and methods for identifying or verifying users. In particular, but without limitation, the present disclosure relates to systems and methods for dialogue based identification or verification.

BACKGROUND

Conversational systems such as voice-based agents are used in many applications such as voice-based search, recommendation, booking, telephone help systems, customer service, and e-banking amongst others. For example, customer support services and call centres may be automated through voice-based, self-service Interactive Voice Response (IVR) systems.

Many conversational systems, such as IVR systems, include a step of identifying or verifying users, before establishing and granting access to services and private data. There is a continuing need to improve the identification and verification of users.

SUMMARY

According to a first aspect, there is provided a computer-implemented method comprising:
  obtaining, by way of an input, input data relating to speech provided by a user; deriving one or more hypotheses for each of a plurality of user data fields from the input data;
  obtaining one or more reference values for each of the plurality of user data fields for each of one or more candidate users;
  calculating a score for at least one candidate user of the one or more candidate users, calculating the score comprising:
    calculating a plurality of user data field scores comprising, for each of the plurality of user data fields, a respective user data field score using the one or more hypotheses and the one or more reference values for the candidate user for the respective user data field;
    performing one or more fuzzy logic operations on the plurality of user data field scores;
  using the score for a candidate user of the one or more candidate users to perform a verification or identification process for the user.

In some examples, the one or more hypotheses comprise one or more proposed values.

In some examples, the method further comprises:
  determining whether the score for the candidate user of the one or more candidate users meets a threshold.

In some examples, the one or more candidate users is a single candidate user and the score for the candidate user is used to perform a verification process for the user, wherein using the score for the candidate user to perform the verification process comprises, in response to determining that the score for the candidate user meets the threshold, verifying that the user is the candidate user.

In some examples, the at least one candidate user is a plurality of candidate users, the method further comprising:
  determining a candidate user of the plurality of candidate users having a maximum score; and
  identifying the user as the candidate user.

In some examples, for each of one or more user data fields of the plurality of user data fields, calculating the respective user data user field score comprises performing a fuzzy comparison of the one or more proposed values and the one or more reference values for the candidate user for the respective user data field.

In some examples, for at least one of the one or more user data fields, performing the fuzzy comparison comprises performing one or more fuzzy text containment operations or one or more fuzzy text similarity operations.

In some examples, for at least one of the one or more user data fields, performing the fuzzy comparison comprises performing one or more fuzzy temporal comparison operations.

In some examples, performing the one or more fuzzy logic operations comprises applying one or more Zadeh operators.

In some examples, deriving the one or more proposed values for at least one user data field of the plurality of user data fields comprises performing automatic speech recognition.

In some examples, for at least one user data field of the plurality of user data fields, the one or more hypotheses are a plurality of ordered hypotheses.

In some examples, calculating the respective user data field score for the at least one user data field comprises:
  calculating a plurality of hypothesis scores, wherein the plurality of hypothesis scores comprise a respective value score for each of at least a subset of the plurality of hypotheses; and
  performing one or more fuzzy logic operations on the plurality of hypothesis scores.

In some examples, calculating a respective user data field score comprises calculating a phonetic user data field score and an orthographic user data field score.

In some examples, deriving the one or more hypotheses comprises performing a grapheme to phoneme conversion.

In some examples, calculating a respective user data field score comprises applying a fuzzy logic operator to the phonetic user data field score and the orthographic user data field score.

In some examples, the fuzzy logic operator is a fuzzy OR operator.

In some examples, the method further comprises:
  in response to verifying that the user is the candidate user, outputting a confirmation that an identity of the user has been verified.

In some examples, the method further comprises:
  in response to verifying that the user is the candidate user, providing access to an authenticated system.

The methods are computer-implemented methods. Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium.

In a second aspect, there is provided a non-transitory computer readable storage medium comprising computer readable code configured to cause a computer to perform the following:
  obtaining, by way of an input, input data relating to speech provided by a user;

deriving one or more hypotheses for each of a plurality of user data fields from the input data;

obtaining one or more reference values for each of the plurality of user data fields for each of one or more candidate users;

calculating a score for at least one candidate user of the one or more candidate users, calculating the score comprising:

calculating a plurality of user data field scores comprising, for each of the plurality of user data fields, a respective user data field score using the one or more hypotheses and the one or more reference values for the candidate user for the respective user data field;

performing one or more fuzzy logic operations on the plurality of user data field scores;

using the score for a candidate user of the one or more candidate users to perform a verification or identification process for the user.

In a third aspect, there is provided a system, comprising one or more processors, the one or more processors configured to:

obtain, by way of an input, input data relating to speech provided by a user;

derive one or more hypotheses for each of a plurality of user data fields from the input data;

obtain one or more reference values for each of the plurality of user data fields for each of one or more candidate users;

calculate a score for at least one candidate user of the one or more candidate users, calculating the score comprising:

calculating a plurality of user data field scores comprising, for each of the plurality of user data fields, a respective user data field score using the one or more hypotheses and the one or more reference values for the candidate user for the respective user data field;

performing one or more fuzzy logic operations on the plurality of user data field scores;

use the score for a candidate user of the one or more candidate users to perform a verification or identification process for the user.

BRIEF DESCRIPTION OF THE DRAWINGS

Arrangements of the present invention will be understood and appreciated more fully from the following detailed description, made by way of example only and taken in conjunction with drawings in which:

FIG. 9(c) shows an example pre-training process which may be used to train a value extraction model which may be used in a method according to an embodiment.

DETAILED DESCRIPTION

Figure 1:
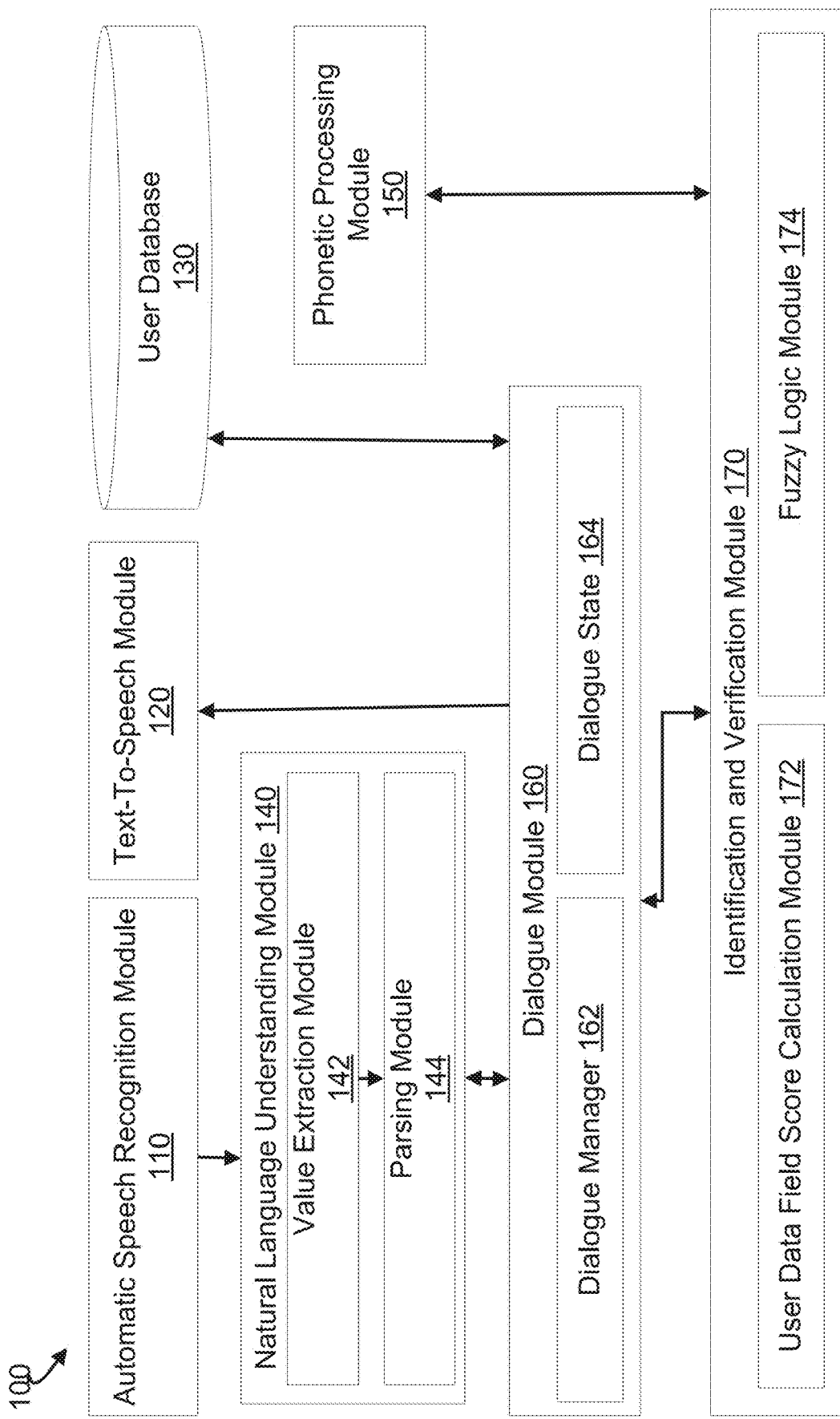
FIG. 1 shows a schematic detailing a system for identifying or verifying a user in accordance with an embodiment.

The systems and methods described herein address a technical problem tied to conversational systems and arising in the realm of Interactive Voice Response (IVR) systems, namely improving the identification and verification of users.

The described systems and methods provide knowledge-based identification and/or verification of users from speech. In other words, the systems and methods identify and/or verify the user based on "what the user knows", where the user provides the information indicating "what they know" as speech. Such speech-based knowledge-based authentication can be used to automatically identify and/or verify users through spoken language.

Other automated approaches to identification and verification may use non-verbal input methods or different authentication factors, such as biometric authentication factors. The use of non-verbal input methods may be unsuitable for some applications, for example where audio is the only available input mechanism for the user. Furthermore, even where non-verbal input methods are available, the use of such methods within an IVR system may inconvenience the user, e.g. such non-verbal input methods may require tactile interaction with a device so cannot be used hands-free.

Knowledge-based authentication factors may be used by the system in order to provide a service, in addition to performing user identification and verification. For example, where the IVR system is a booking system, the user's full name, address, postcode and telephone number may be stored in order to make bookings. This information can then also be used to perform identification and verification.

Knowledge-based authentication factors can also be used in addition to such other identification and verification approaches in some examples. For example, knowledge-based authentication factors may be used in combination with biometric authentication factors to provide a greater level of security.

In a knowledge based authentication approach which uses speech input, non-exact matches between information extracted from the speech input and the stored knowledge-based authentication factors can occur. In particular, the automatic speech recognition performed on the input audio may sometimes return a word which is similar to but not the same as the word spoken by the user. Thus, it is desirable that knowledge-based identification and verification systems using speech can account for non-exact matches, while maintaining a desired level of security.

The proposed systems and methods can utilize non-exact matches for identification and verification while maintaining a level of security. The proposed systems and methods use fuzzy logic to calculate a total score usable for identification and verification, based on scores across multiple knowledge-based authentication factors. The total score may be used to quantify an overall closeness of a match between the inputs provided by a user and the knowledge-based authentication factors. Fuzzy logic is used to support the use of non-exact matches and therefore increase recall, e.g. reduce false negatives. Fewer operations may be performed in identifying and verifying a user, as fewer reattempts at the identification and verification may be needed.

In some examples, whether a user is identified and/or verified is determined based on whether the score is above or below a threshold. Therefore, a requisite level of security may be achieved by setting this threshold to an appropriate value. For example, the requisite level of security for a telephone help IVR system may be lower than that for an e-banking IVR system, so the threshold used for a telephone help system may be lower than that used for an e-banking IVR system.

FIG. 1 shows a schematic of a system 100 for identifying or verifying a user in accordance with an embodiment. The system 100 comprises a spoken dialogue system that requests information relevant for identification or verification from the user over several dialogue turns.

The system 100 includes an automatic speech recognition module 110, a text-to-speech module 120, a user database 130, a natural language understanding module 140, a phonetic processing module 150, a dialogue module 160, and an identification and verification module 170. The system is used to conduct a dialogue with a user.

The automatic speech recognition (ASR) module 110 receives speech data from a speech input provided by a user and generates a text signal based on the speech data. The speech data may comprise an audio file or audio stream. In this example, the text signal comprises an orthographic text signal. For example, the text signal may be orthographic text representing text in a natural language, e.g. English in Latin characters, Russian in Cyrillic characters, or Mandarin Chinese in Chinese characters. Characters of orthographic text representing text in a natural language may be referred to as graphemes. The speech recognition module 110 transcribes the user's utterance into a list of N possible orthographic texts, referred to as an N-best list, where N is an integer greater than zero.

In some examples, the ASR module 110 additionally or alternatively outputs a phonetic text signal. For example, the text signal may represent the pronunciation of the one or more audio inputs using a phonetic alphabet, e.g. the International Phonetic Alphabet (IPA) or Speech Assessment Methods Phonetic Alphabet (SAMPA). Characters of phonetic text may be referred to as phonemes. The ASR module 110 may perform a first step of generating a phonetic text signal from the audio signal, and a second step of generating an orthographic text signal from the phonetic text signal. In some examples, both the phonetic text signal and the orthographic text signal are outputted, in the form of a list of N possible orthographic texts and the N corresponding phonetic texts.

The automatic speech recognition module 110 may perform speech recognition using any suitable method. For example, a trained speech recognition algorithm based on a neural network or Hidden Markov Model may be used. ASR models may assign posterior probabilities to words and/or characters in an utterance given the input audio signal. The ASR output takes the form of an N-best list, which approximates the full posterior distributions over the ASR outputs by returning the top N most probable outputs with their respective probabilities. In some examples, only the top scoring ASR output is used, in other words N is equal to 1. In other examples, N is greater than one, such that multiple ASR outputs are outputted. The ASR module 110 outputs an N-best list for each user input utterance.

The speech data comprises a user input. The inputs by the user may be received using an audio input device, e.g. a microphone. The inputs may be received by an audio input device connected to or forming part of the computing device(s) implementing the ASR module 110, e.g. where the ASR module 110 is implemented on a client computing device. Alternatively, the ASR module 110 may be implemented on a server computing device, with the inputs being obtained on a different client computing device. The speech of the user may be encoded into one or more audio data files and/or one or more audio data streams by the client computing device. The client computing device may send the one or more audio data files and/or one or more audio data streams to the server computing device. The server computing device may receive the one or more audio data files and/or the one or more audio data streams. The ASR module 110 may process the received one or more audio data files and/or the one or more audio data streams as the speech data in order to generate the text signal.

The ASR module 110 may be a biased ASR module 110. A biased ASR module 110 may boost the probabilities that certain words and/or types of words are recognised in the provided speech. For example, the ASR module 110 may be adapted so as to increase the likelihood that names are recognised. As another example, where verification of a particular user is being performed, the ASR module 110 may be biased so as to increase the likelihood that the details of that user are recognised, e.g. if the user to be verified is called 'John Smith' and was born in November then the probability that 'John', 'Smith', and 'November' are recognised may be increased.

The user database 130 stores reference values corresponding to a plurality of user data fields for each of a plurality of registered users. The plurality of user data fields comprises user data fields for identifying and/or verifying the user. Examples of such user data fields include but are not limited to: first name, last name, middle name(s), full name, postal codes (e.g. a postcode, ZIP code, Postal Routing Number, or Postal Index Number), address, one or more telephone number(s), date-of-birth, identification (ID) number, passphrase and/or password. The reference values comprise the information that populates the user data fields. For example, for a first registered user, the user data field "first name" is populated with the reference value "John", and the user data field "second name" is populated with the reference value "Smith". For a second registered user, the user data field "first name" is populated with the reference value "Joan", and so on.

The user database 130 provides data storage and access functionality, whereby data can be written to, deleted from, overwritten to and read from the user database 130. The user database 130 may be any combination of software and hardware capable of providing this functionality. For example, the database software may be: a relational database server, e.g. a Standard Query Language (SQL) database server; a NoSQL database server, e.g. a key-value store server, a column store server, a document store server or a graph database server; or a file storage server, e.g. a file transfer protocol.

The natural language understanding (NLU) module 140 includes a value extraction module 142 and a parsing module 144. The natural language understanding module 140 receives text from the ASR module 110 and extracts proposed values for one or more user data fields based on the received text signal(s). In this example, the NLU module 140 receives the N-best list of possible orthographic text signals from the ASR module 110 for the dialogue turn. The value extraction module 142 and the parsing module 144 extract relevant identifying information from these transcribed texts, to populate the user data fields. The extracted identifying information, also referred to as proposed values, might be postcode, names, etc. corresponding to the user data fields as described above. The natural language understanding module 140 outputs the proposed values for the one or more user data fields. In this example, the natural language understanding module 140 sends the proposed values for the one or more data fields to the dialogue module 160. The NLU module 140 may also send the received N-best list from the ASR module 110 to the dialogue module 160.

The dialogue conducted with the user may comprise multiple dialogue turns. A dialogue turn comprises a user input and the subsequent system output. For example, a dialogue turn may begin at the start of a user input and end at the end of the next system output. The ASR module 110 outputs the N-best ASR outputs for each user input, i.e. for each dialogue turn. In this example, the ASR output is processed one turn at a time by the NLU module 140.

The received orthographic text signal(s) at the NLU module 140 comprises one or more ASR outputs from the ASR module 110 corresponding to a dialogue turn. In examples where N=1, the received text signal is a single ASR output. Proposed values for one or more user data fields are then extracted from the single ASR output. In examples where N is greater than 1, the received text signals include multiple ASR outputs, in the order of the probability assigned to each ASR output by the ASR module 110, from the most likely to the least likely. Proposed values for one or more user data fields are extracted from the multiple ASR outputs, where the ASR outputs are analysed in order. N proposed values may be extracted for a user data field where the received text signal comprises an N-best list of ASR outputs.

Determining one or more proposed values for a user data field from the received text signal(s) comprises extracting values for the user data field using the value extraction module 142. In examples where N is greater than 1, a proposed value for a given user data field may be obtained from each of the multiple ASR outputs. The set of proposed value(s) for the user data field comprises the extracted value(s) for that user data field. The proposed value(s) for the user data field may further comprise one or more transformed value(s) derived from the extracted value(s) using the parsing module 144. The parsing module 144 is configured to derive one or more transformed values based on an extracted value. An example is described in relation to date parsing below.

The value extraction module 142 processes the received text signal(s) for the dialogue turn to extract one or more proposed values from the text signal corresponding to a user data field. The value extraction module 142 takes as input the text corresponding to an entry from the N-best list output from the ASR module—in other words text corresponding to the user utterance. The value extraction module 142 outputs a span of this text, in other words a part of this text, which is an extracted value. For example, the text signal from the automatic speech recognition module 110 is "My first name is John". The value extraction module 142 extracts "John" as a proposed value corresponding to the "first name" user data field. In some examples, the value extraction module 142 uses a specific functionality for capturing character sequences, such as postal codes or phone numbers. For example, a regular expression that specifies a specific sequence of characters or character sequence pattern can be used to search for and extract a post code or phone number from the ASR output.

The value extraction performed by the value extraction module 142 is based on information which indicates the expected user data field for the dialogue turn. During the dialogue, the system provides an output to the user each dialogue turn, which prompts the user to speak a relevant value corresponding to a user data field. For example, the system asks the user "What is your first name?". In the next dialogue turn, a response including a value for the "first name" user data field is expected from the user.

In one example, the value extraction module 142 may perform value extraction using the techniques described in Henderson & Vulić—"ConVEx: Data-Efficient and Few-Shot Slot Labelling", 7 Jun. 2021, arXiv:2010.11791, the entire contents of which are incorporated herein by reference. Alternative methods of performing value extraction may be used however.

Figure 9A:
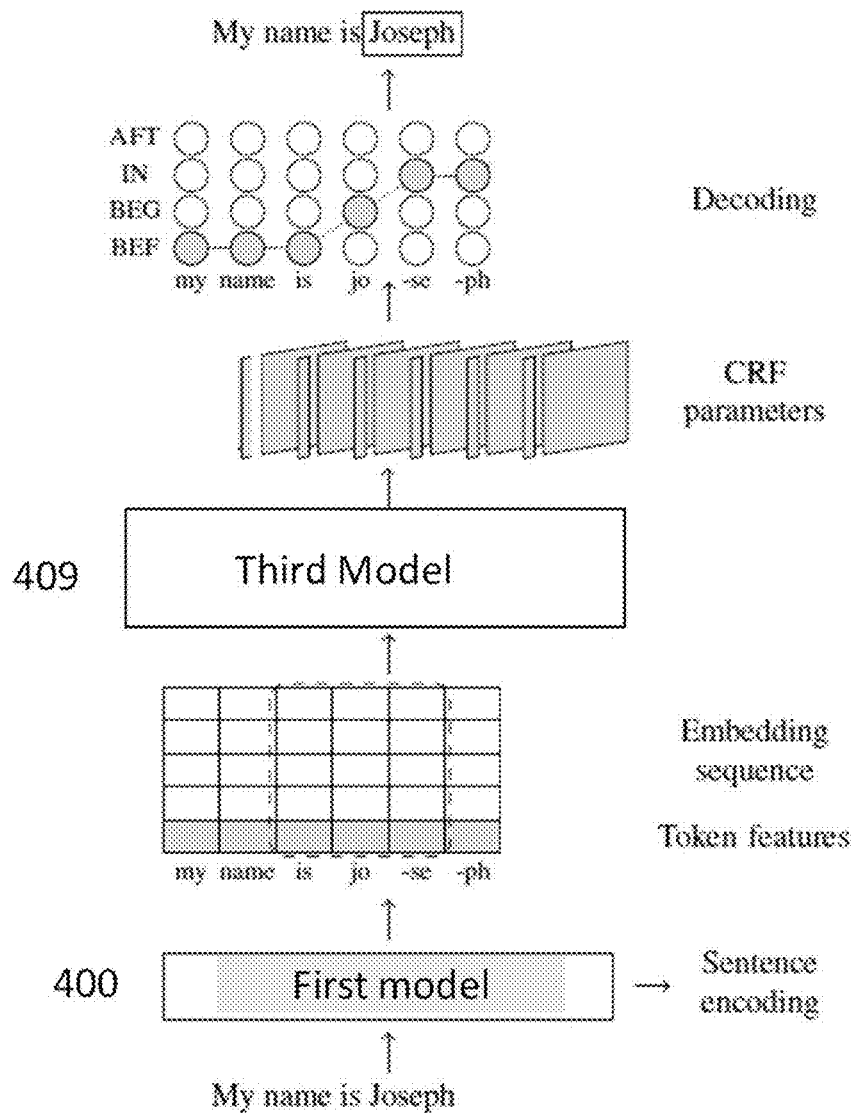
FIG. 9(a) shows a schematic illustration of an example value extraction module which may be used in a method according to an embodiment.
Figure 9B:
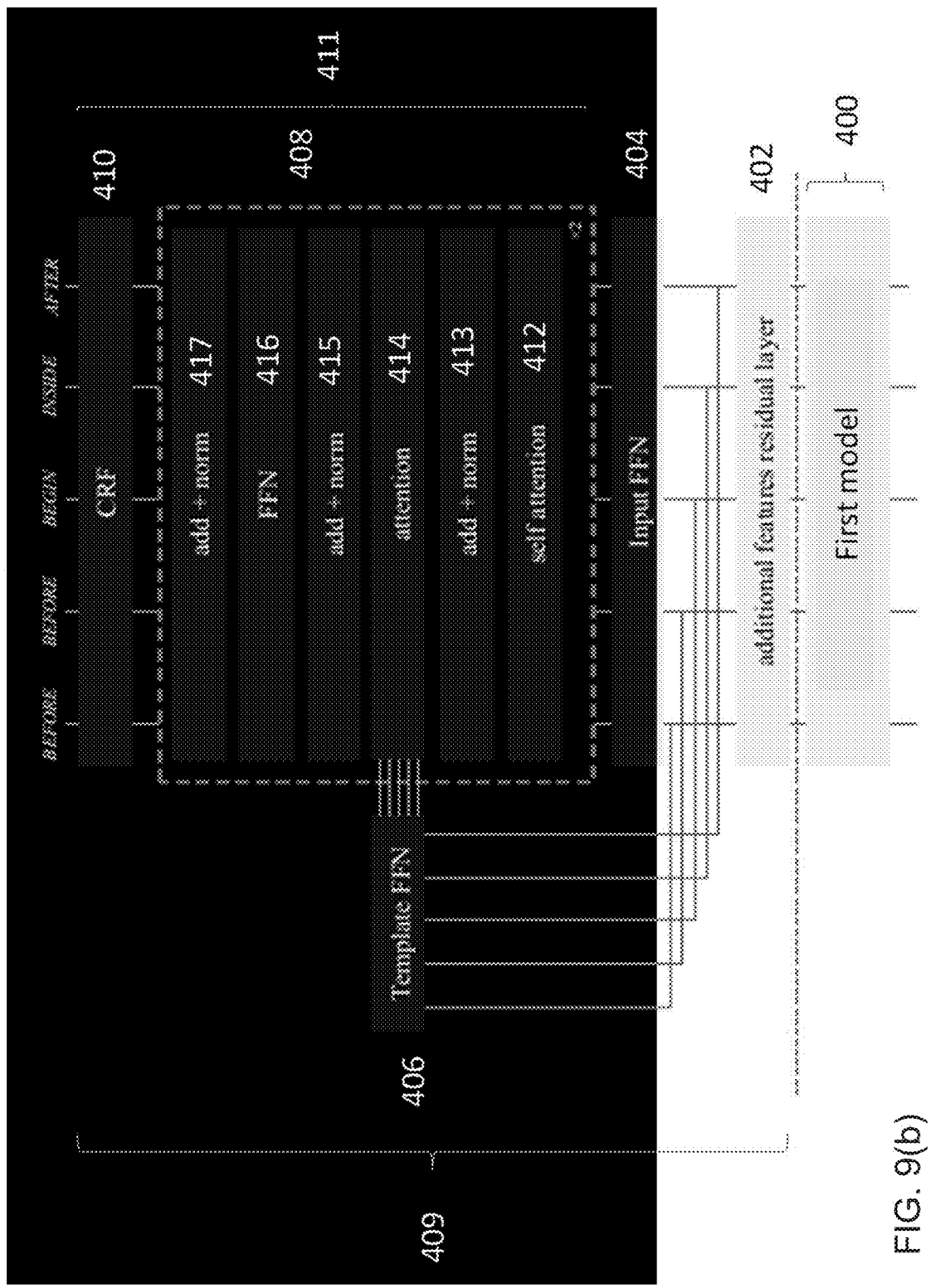
FIG. 9(b) shows a schematic illustration of an example value extraction module which may be used in a method according to an embodiment.

FIGS. 9(*a*) and 9(*b*) show a schematic illustration of an example value extraction module 142. The value extraction module 142 may perform a span based extraction task, in which a value is identified as a single span of text in the ASR output or entirely absent. The value extraction module may first represent the ASR output as a sequence of embeddings using a first model 400, and a trained third model 409 is then used to determine the tag sequence. The tag sequence tags each unit in the sequence with a tag from a set of tags, including a first tag which represents a value. A plurality of third models 409 can be used, each corresponding to a different user data field. The value extraction module 142 has a transformer structure.

In more detail, and as shown in FIGS. 9(*a*) and 9(*b*), the embeddings output from the first model 400 are taken as input to an additional features residual layer 402. The sequence of embeddings output from this layer are taken as input to an input feed forward network (FFN) 404 and also as input to a template feed forward network 406 in the third model 409. These project the embeddings down to lower dimensional embeddings. The third model 409 further comprises a second model 411. The second model 411 determines a tag sequence from the sequence of embeddings output from the input FFN 404. The second model 411 comprises a repeating decoder block 408. In the example shown, the repeating block 408 comprises: a block of self-attention 412, followed by a layer normalisation 413, a block of attention 414 over the sequence of embeddings output from the template FFN 406, followed by a layer normalisation 415 and an FFN layer 416, followed by a layer normalisation 417. The attention layer 414 uses the embeddings output from the template FFN 406. These layers are repeated, such that the second model 411 comprises a second set of these layers. For simplicity, a single block 408 is shown in the FIGURE, with the repetition indicated by "×2". The output sequence of the first block 408 is fed as an input to the second block 408.

The second model further comprises a CRF layer 410. The sequence of vectors output from the second repeated block 408 is then taken as input to the CRF layer 410, which is a linear layer which computes Conditional Random Field (CRF) parameters for tagging the value span using four tags: BEFORE, BEGIN, INSIDE, and AFTER. The BEFORE tag tags the vectors in the part of the input utterance before the value. The BEGIN and INSIDE tags tag the vectors corresponding to the value. The AFTER tag tags the vectors in a part after the value.

In order to train the first model 400 and the third model 409, a transfer learning approach is used, in which a general pre-training process is performed, followed by a specific "fine-tuning" training process using annotated examples. FIG. 9(c) shows an example pre-training process. The pre-training objective comprises sentence-pair value extraction. The training data set comprises sentence pairs from natural language data which share a key phrase, for example a "value" such as a name. In the example shown in FIG. 9(c), the input sentence is "Are you Tina yes?" and the template sentence is "hold old is [blank]", where the phrase "Tina" has been replaced by a special [BLANK] token in the template sentence. The first model 400 generates a fixed number of embeddings corresponding to the input sentence and corresponding to the template sentence. During the pre-training stage, the residual layer 402 is not included. A first part of the input data (in this case "Tina") corresponds to a first unit (in this case referred to as "BLANK") in the template data.

The input set of embeddings corresponding to the input sentence is taken as input to the first input FFN 404. However, unlike during inference, when the input embeddings are also taken as input to the second template FFN 406, during the pre-training process the template embeddings are taken as input to the template FFN 406. The token [BLANK] corresponds to an embedding. The second model 411 determines a tag sequence. The attention layer 414 uses the embeddings output from the template FFN 406. The value extractor model is trained to predict which tokens in the input sentence constitute the key phrase. The input sentence is automatically labelled with the "true" tag values. The part of the input sentence prior to the identified key phrase is labelled "BEFORE", the part of the input sentence corresponding to the key phrase is labelled "BEGIN" and "INSIDE", and the part of the input sentence after the key phrase is labelled "AFTER". These labels are applied automatically, based solely on the key phrase (i.e. that which is in the template sentence). Parameters of the value extractor model are then fine-tuned by training using manually annotated data corresponding to the intended use case after the pre-training stage.

In some examples, the NLU module 140 is further configured to perform intent classification. For example, the NLU module 140 may classify the received text signal, or a part thereof, as corresponding to one of a set of possible user intents. Each of the intents may provide an indication of an operation to perform as part of, instead of, or in addition to the identification and/or verification process. The NLU module 140 sends the intent to the dialogue module 160. An example intent might be that the user wishes to speak to a human operator for example.

The parsing module 144 parses values extracted by the value extraction module 142 to derive transformed values. The parsing module may be implemented using one or more finite state transducers (FSTs), a date parsing library, and/or one or more machine-learning models, e.g. one or more neural networks for example. Parsing may be applied to some of the values extracted using the value extraction module 142 but may not be applied to others of the values extracted using the value extraction module 142. For example, extracted values corresponding to certain user data fields may be parsed while extracted values corresponding to other user data fields may not be parsed. The parsing module 144 outputs data in a format of a specific data type, for example a date.

User data fields whose values are to be parsed may include user data fields which are to be utilized as structured data and/or in a specified format for example. For example, the parsing module 164 may transform values for user data fields corresponding to dates from a transcription of a speech input of a date into a date data format, e.g. a numerical date data format. By transforming dates into a date data format, comparison of proposed dates with reference dates stored in the user database is facilitated. For example, a reference date may be stored in the user database using a numerical format of the type 'yyyymmdd', e.g. '19831205' represents 5 Dec. 1983. Examples of transcriptions of a user's speech input for this date include "fifth December eighty-three" (UK spoken date), "December fifth eighty-three" (US spoken date), "twelve five nineteen eighty-three" (US numerical data) and "five twelve nineteen eighty-three" (UK numerical date). The parsing module 164 may receive any of the above transcriptions extracted by the value extraction module and transform them into the date data format, e.g. as '19831205'.

For certain transcriptions, multiple valid transformations into a date data format may be possible. For example, in the previously presented example 'five twelve nineteen eighty-three' may represent 5 Dec. 1983 or 12 May 1983, depending on whether the date is interpreted as a 'UK numerical date' or 'US numerical date', so may be validly transformed into '19831205' or '19830512'. Where such multiple valid transformations of a transcription data are possible, all or a subset of these multiple transformed values may be outputted by the parsing module 144 as transformed values for the respective user data field.

The parsing module 144 may also perform parsing for spellings for example. For example, an extracted value may be parsed to generate a transformed value that corresponds to an alternative spelling of the extracted value.

The values output from the value extraction module 142 are referred to as the extracted values, where an extracted value comprises a span of text. The values output from the parsing module 144 are referred to here as the transformed values, where the transformed value may comprise a span of text or data formatted as a specific data type (e.g. a date). The set of proposed values generated for a user data field comprises the extracted values and any transformed values corresponding to the user data field. The proposed values are outputted from the NLU module 140 to the dialogue module 160.

The dialogue module 160 includes a dialogue manager 162 and dialogue state 164.

The dialogue manager 162 selects an appropriate system response following the latest user input. In this way, the dialogue manager 162 controls a dialogue flow in which a user is queried for information to populate the user data fields, as part of a multi-turn conversation. A rule based dialogue manager 162 may be used, in which the desired system behaviour is manually specified in a set of stored rules. The dialogue manager 162 selects a system output from a set of stored possible system outputs, based on the set of stored rules. The rules are applied to the current information in the dialogue state 164 to determine the next system output. Each system output comprises a text response to the user. At least some of the set of text responses correspond to requests for information to populate the various user data fields, such as "What is your first name?" and "What is your postcode?". For example, the dialogue manager 162 asks for information corresponding to one user data field for each dialogue turn, where the set of responses comprises a request corresponding to each user data field. The rules may be applied in a set order, so that the system requests information for the user data fields in a set order. In some examples, the rules may be conditioned on the information stored in the dialogue state, so that the system requests information for a user data field which does not have a value stored in the dialogue state. The system outputs may be provided to the user as text or as speech. If the outputs are to be provided as speech, the dialogue manager 162 provides the system output text to a text-to-speech module 120, which converts it to speech.

In some examples, the dialogue manager 162 may receive an intent from the NLU module 140. The dialogue manager 162 may use the intent in selecting the system response. For example, the intent may indicate that the user wishes to speak to a (human) manager. The dialogue manager 162 may then provide a system output "transferring you to a manager" and may cause the user to be connected to a manager. As another example, the intent may correspond to a request by the user to input a certain user data field. The dialogue manager 162 may then provide a system response requesting that the user provide an input for this user data field.

The dialogue manager 162 receives information including the proposed value(s) for a user data field from the natural language understanding module 140 each dialogue turn. The dialogue manager 162 may further receive the ASR output, in this example the N-best list of orthographic text outputs corresponding to the dialogue turn. The dialogue manager 162 may further receive information indicating the user intent. The dialogue manager 162 maintains the dialogue state 164. The dialogue state 164 comprises stored information, including the proposed values received from the natural language understanding module 140. The dialogue state 164 may further store the ASR output and/or the intent information. The dialogue manager 162 stores and tracks the proposed values output from the NLU module 140 in the dialogue state 164. The dialogue state 164 may be stored using a map data structure, e.g. a key-value map, which maps the name of or another identifier for a user data field (the key) to one or more proposed values for that user data field. Examples of map data structures include Python dictionaries and Java HashMaps.

For an identification task, as the proposed values are received from the NLU module 140, the dialogue manager 162 also issues API calls to query the user database 130 regarding registered users. Any returned possibilities are also stored in the dialogue state 164, as a list of candidate users. For example, any registered users having values for one or more user data fields which are the same as or similar to the proposed values are taken. For example, all users either having first names similar to 'John' or located in "Cambridge" may be obtained. The user database 130 may be queried using an information retrieval system, framework or library. For example, an API using a fuzzy query may be used to query the user database 130. Alternatively, all of the registered users are obtained from the user database 130 in this step. Greater recall may be achieved by obtaining more users from the user database 130 as candidate users. Obtaining more users from the user database 130 may increase the amount of computational resources used however, e.g. the amount of computational processing power, memory and/or bandwidth used. In an example, 100 or fewer users may be obtained from the user database 130 as the list of candidate users. Obtaining a maximum of approximately 100 users may facilitate high recall while limiting the amount of computational resources used. While 100 users is provided as an example, the number of users obtained may be set according to the amount of computational resources available. For example, where the amount of computational resources is greater, the maximum number of users may be in the range 101-1000, e.g. in the range 200-300, 250-500, or 500-750.

For a verification task, the dialogue manager 162 may be provided separately with information identifying the registered user for which the verification is being performed. For example, the registered user may be identified using caller identification of the phone number from which a user of the IVR system is calling. As another example, the IVR system may be identified from the user account using which the user is interacting with the IVR system, e.g. the user may interact with the IVR system using a dedicated application, a VoIP application, a messaging application with VoIP functionality, and/or a web application with VoIP functionality, for which the user has a user account. The registered user information is stored in the dialogue state 164 as the single candidate user. Alternatively, an identification task may be performed together with the verification task, in order to first identify the registered user against which the user is to be verified.

The dialogue state 164 may be populated with the candidate user information prior to, during or after the dialogue flow. After the dialogue manager 162 has collected the information from the user dialogue (comprising multiple turns) and the user database 130, the identification and verification process is performed using the identification and verification module 170. Once the dialogue state 164 comprises at least one proposed value for each user data field used by the identification and verification module 170, the dialogue manager 162 determines that the identification and verification process can be performed.

The dialogue manager 162 formulates the proposed values stored in the dialogue state 164 into a set of candidate hypotheses. In this example, the set of candidate hypotheses comprise the N-best list of raw transcripts output from the ASR module 110, and the corresponding list of extracted and parsed values for the user data field. Candidate hypotheses are generated during the dialogue, i.e. during the conversational exchange with the user. The candidate hypotheses may be stored in an ordered list, where the order is from the most likely to the least likely. The ordered list may comprise the parsed values in order of the corresponding ASR N-best list, followed by the extracted values in order of the corresponding ASR N-best list, followed by the ASR N-best list output. In this example, a set of one or more candidate hypotheses is generated for each user data field, where the set comprises the parsed values in order of the N-best list, followed by the extracted values in order of the N-best list, followed by the ASR N-best list output for the user data field. However, the hypotheses may comprise only extracted values or only proposed values for example.

In some embodiments, a pre-built library is used to formulate the candidate hypotheses from the proposed values, alternatively to or in conjunction with the dialogue manager 162.

The set of candidate hypotheses include one or more proposed values for each of a plurality of user data fields. The proposed values are received from the natural language understanding module 140. There may be multiple proposed values for a given user data field, for example because a value for the user data field may have been extracted from each of multiple ASR outputs. The candidate hypotheses may further comprise the ASR N-best list.

The system also formulates the list of one or more candidate users stored in the dialogue state 164 into candidate references. Candidate references comprise the reference values for the user data fields for each candidate user. Where (only) verification is being performed, the reference values correspond to a single candidate user to be verified. Where identification is being performed, the reference values correspond to a plurality of candidate users. The reference values are obtained from the user database 130.

The phonetic processing module 150 is a module for translating graphemes to phonemes, for example translating orthographic text to phonetic text. The phonetic processing module 150 receives text from the Identification and Verification Module 170. For example, the Identification and Verification Module 170 may transmit the N-best ASR outputs to the phonetic processing module 150. The phonetic processing module generates phonetic text corresponding to the orthographic text for each entry in the N-best list. The output of the phonetic processing module 150 is provided to the identification and verification module 170.

The phonetic processing module 150 may output one or more phonetic texts for each input orthographic text. For example, the phonetic processing module 150 may output a plurality of phonetic texts for a given orthographic text, as there may be multiple valid phonetic translations of the orthographic text, e.g. there may be multiple valid pronunciations of the orthographic text. The plurality of phonetic texts for the given orthographic text may be an M-best list of phonetic texts for the given orthographic texts, where M is greater than or equal to N. The phonetic processing module 150 may translate graphemes to phonemes using any suitable method. For example, the phonetic processing module may translate graphemes to phonemes using a Hidden Markov Model-based grapheme-to-phoneme model, a neural machine translation-based grapheme-to-phoneme model, a phonetic dictionary-based method, a rules-based method or any combination thereof.

The phonetic processing module 150 is an optional module, and in some examples this module is omitted. For example, where the ASR module 110 additionally outputs a phonetic text signal or where phonetic comparison is not performed, the phonetic processing module 150 may be omitted. Where the ASR module 110 additionally outputs phonetic text, the phonetic text is provided to the dialogue manager 160, which in turn provides the phonetic text to the identification and verification module 170.

Translating graphemes to phonemes may be computationally expensive. In some examples, the phonetic processing module 150 may cache the one or more phonetic texts for a given input orthographic text. When the phonetic processing module 150 receives a future request for phonetic text(s) for the given input orthographic text, the phonetic processing module 150 may provide these cached one or more phonetic texts. The cache may have a limited capacity, e.g. the cache may be limited to storing a maximum number of phonetic texts and/or using a maximum amount of memory. In this situation, the input orthographic texts for which phonetic text(s) are stored may be determined based on the frequency with which phonetic texts for that orthographic text are requested, e.g. the phonetic texts for frequently requested orthographic input texts may be kept in the cache whereas the phonetic texts for rarely requested orthographic input texts may be discarded from the cache. For example, phonetic texts may be frequently requested for orthographic texts corresponding to common names of users, e.g. "Oliver", "Sarah", "John", and "Emma" in the United Kingdom. As another example, phonetic texts may be frequently requested for orthographic texts corresponding to date components, e.g. "First", "November" and "Twenty twenty one".

After the system 100 has collected all the information from the user dialogue and the user database 130, the identification and verification process is performed. The information from the user dialogue comprises one or more hypotheses for each of a plurality of user data fields. The hypotheses comprise one or more proposed values for each of the plurality of user data fields. The hypotheses may further comprise one or more ASR outputs for each of the plurality of user data fields. The information from the user database 130 comprises one or more reference values for each of the plurality of user data fields for each of one or more candidate users.

Thus after obtaining the set of hypotheses for all of the user data fields to be used by the verification or identification process, the dialogue manager 162 provides the hypotheses and reference values to the identification and verification module 170. The dialogue manager 162 may receive an indication of the outcome of the identification and/or verification from the identification and verification module 170. In response to receiving the confirmation of a successful identification and/or verification, the dialogue manager 162 may provide a system output confirming that the user has been identified and/or verified. The dialogue manager 162 may then provide the user access to an authenticated system. The authenticated system may be provided by or using another component or a distinct system for example. In response to receiving an indication of an unsuccessful identification and/or verification, the dialogue manager 162 may provide a system output information to the user. The dialogue manager 162 may then not provide the user access to the authenticated system.

Figure 3:
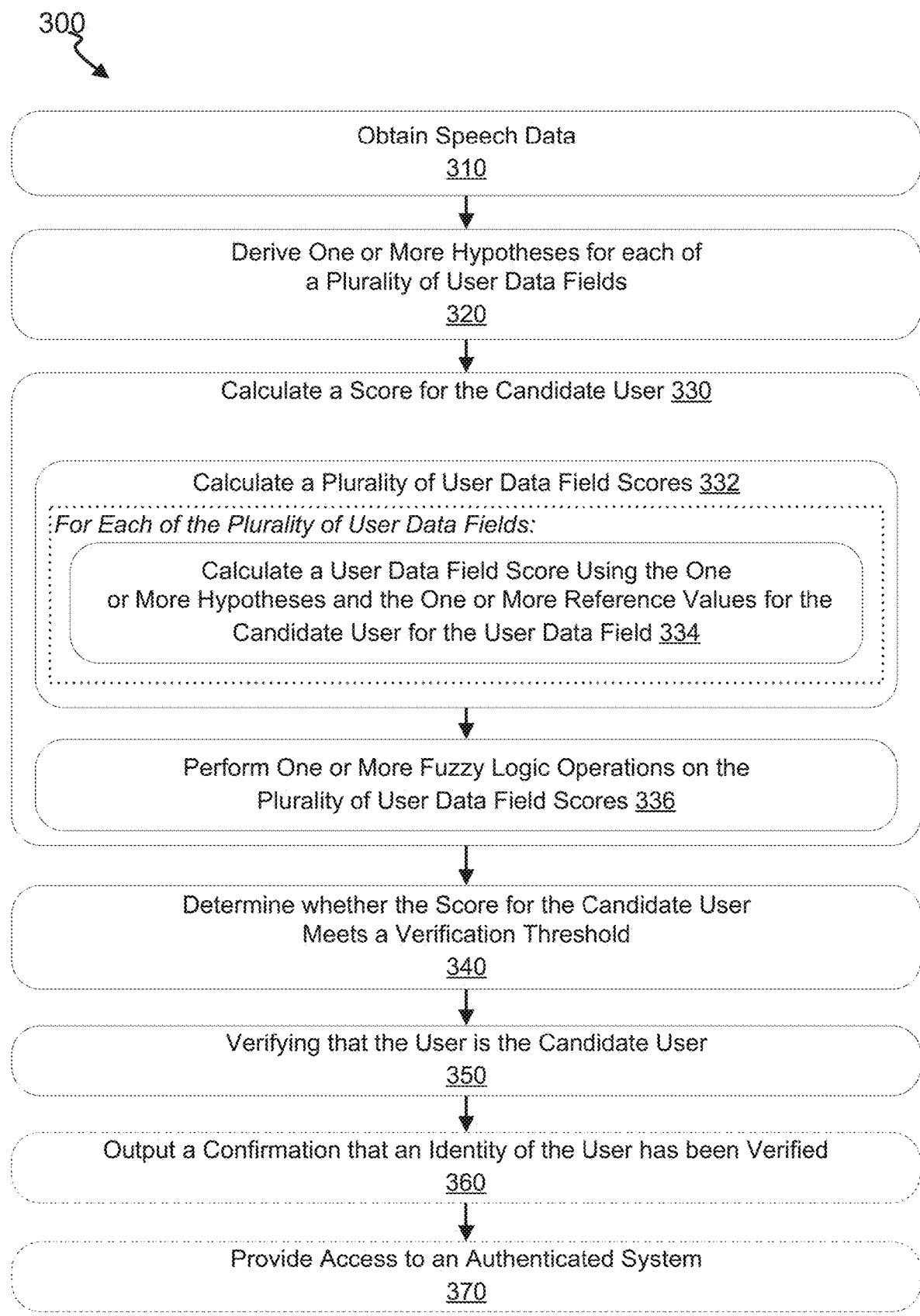
FIG. 3 shows a method for verifying a user according to an embodiment.

The identification and verification module 170 may verify users using steps 330 to 350 of the example method 300 described in relation to FIG. 3 for example. The identification and verification module 170 may identify users using steps S430 to S450 of the example method 300 described with respect to FIG. 4 for example.

As described above, the identification and verification module 170 may obtain proposed phonetic values and phonetic text to be compared with reference phonetic values. If this phonetic text comparison is to be performed, the phonetic processing module 150 may extend the proposed orthographic text values, ASR output, and candidate reference orthographic text values received from the dialogue manager 162 with their phonetic transcriptions. In this case, the identification and verification module 170 may provide the proposed orthographic text values generated by the NLU module 140 and the ASR output to the phonetic processing module 150 to generate the proposed phonetic values and phonetic text. In this manner, the identification and verification module 170 obtains proposed phonetic values for the user data fields by translating the orthographic text values of the user data fields into phonetic text values using the phonetic processing module 150. The identification and verification module 170 also obtains phonetic text corresponding to the ASR N-best list output by providing the ASR output to the phonetic processing module 150. There may be more proposed phonetic values for at least one of the user data fields than proposed orthographic text values, because multiple phonetic translations of a proposed orthographic text value may be received from the phonetic processing module 150.

Alternatively or additionally, the proposed phonetic values and phonetic text may be obtained or have been obtained using the ASR module 110, and the phonetic processing module 150 may be omitted. For example, the proposed phonetic text values may form part of the proposed values provided to the identification and verification module 170 by the dialogue manager 162.

Alternatively or additionally, the reference phonetic values may be retrieved from the user database 130 by the identification or verification module 170 or may have been retrieved by the dialogue manager 162 and form part of the reference values provided to the identification and verification module 170. The user database 130 may store one or more reference phonetic values corresponding to each reference orthographic value for the user data field. There may be more reference phonetic values for at least one of the user data fields than reference orthographic text values, because multiple phonetic translations of a reference orthographic text value may be stored. The identification and verification module 170 includes a user data field score calculation module 172 and a fuzzy logic module 174.

Figure 4:
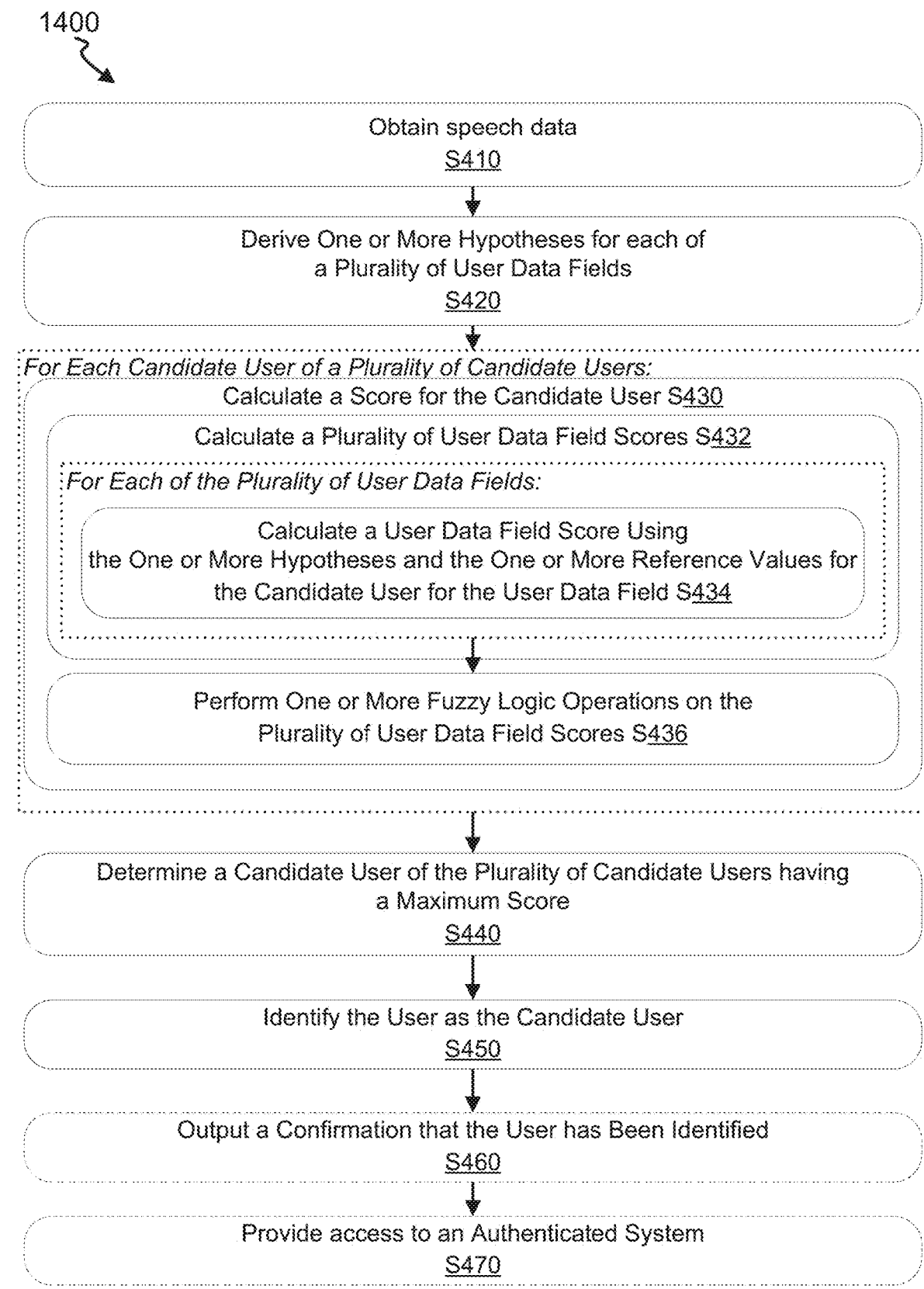
FIG. 4 shows a method for identifying a user according to an embodiment.
Figure 5:
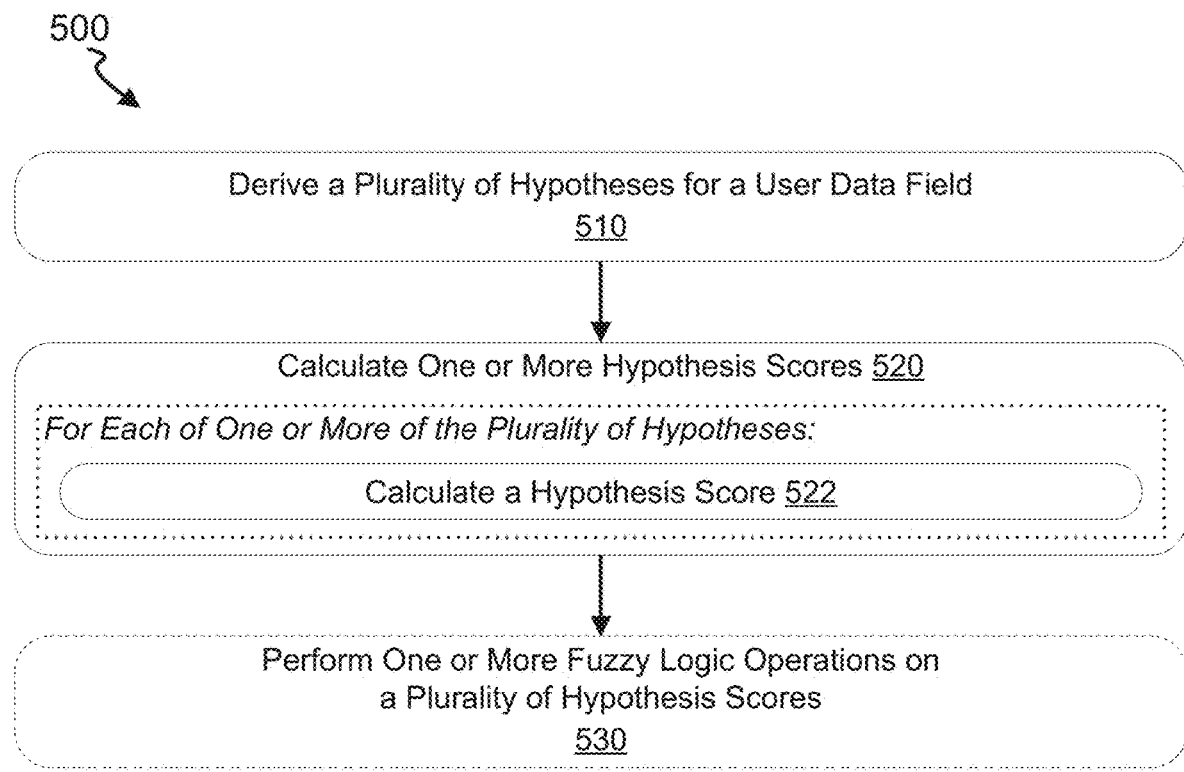
FIG. 5 shows a method for calculating a user data field score used in a method according to an embodiment.
Figure 6:
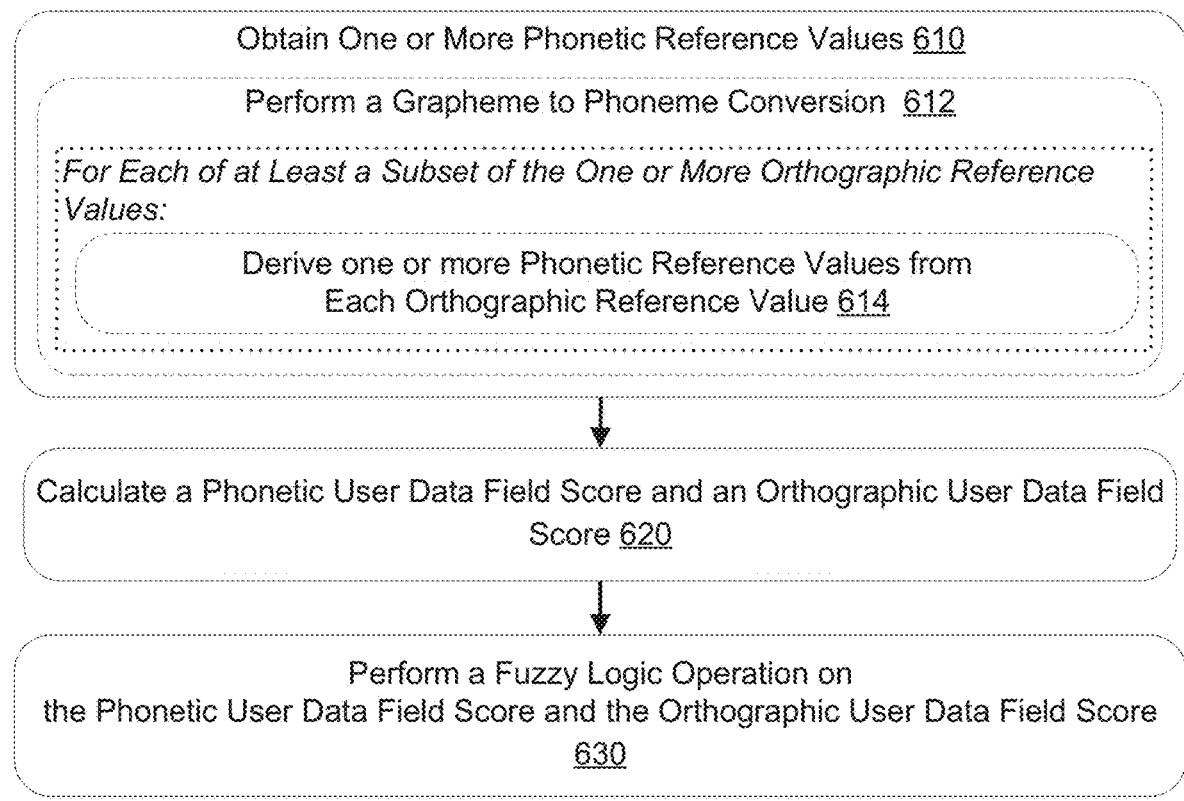
FIG. 6 shows a method for calculating a user data field score used in a method according to an embodiment.

The user data field score calculation module 172 may calculate user data field scores using any or any combination of the methods described in relation to the step 334 of FIG. 3, step 434 of FIG. 4, the method 500 described in relation to FIG. 5, and/or the method 600 described in relation to FIG. 6. The user data field score for a given candidate user may be calculated by comparing the reference value(s) for the user data field for the candidate user with the one or more hypotheses for that user data field. The calculated user data field score may be based on the closeness of the match. Fuzzy matching may be performed. The calculated user data field score may be from zero to one, with zero indicating strict dissimilarity and one indicating complete similarity. The user data field score calculation module 172 may apply a threshold to the user data field score such that calculated user data field scores below a specified value are set to zero. Examples of applying such thresholds are described below in relation to the step 334 of FIG. 3, step S434 of FIG. 4, the method 500 described in relation to FIG. 5A, and/or the method 600 described in relation to FIG. 6.

The user data field score calculation method may calculate user data field scores based on any, any combination or all of the hypotheses for a given user data field. For example, the user data field score for a given user data field may be calculated based on fuzzy comparisons of the proposed parsed value(s) (where parsing is performed for that user data field) with the reference value(s), fuzzy comparisons of the proposed extracted value(s) with the reference value(s), and fuzzy comparisons of the ASR outputs for the user data field with the reference value(s). The comparisons may occur in this order, e.g. the proposed parsed value(s) (where present) may be compared first, then the proposed extracted value(s) may be compared, then the ASR outputs for the user data field may be compared.

The fuzzy logic module 174 performs one or more fuzzy logic operations on the user data field scores for the candidate user to derive a score for the candidate user. Examples of fuzzy logic operations include fuzzy AND, fuzzy OR and fuzzy NOT operations. In this example, the one or more fuzzy logic operations are performed by applying one or more Zadeh operators. The Zadeh operators are as follows. The fuzzy AND of two inputs is the minimum of the two inputs: x AND y=MIN (x, y). The fuzzy OR of two inputs is the maximum of the two inputs: X OR Y=MAX (x, y). The fuzzy NOT of an input is one minus the input: NOT (x)=1−x. These operators can facilitate use of "early stopping" procedures, as will be described below.

In some alternative examples, the one or more fuzzy logic operations may be performed by applying one or more product fuzzy logic operators. The product fuzzy logic operators are as follows. The fuzzy AND of two inputs is the product of those inputs: x AND y=xy. The fuzzy NOT of an input is one minus the input: NOT(x)=1−x. The fuzzy OR of two inputs is derived based on the fuzzy AND and fuzzy NOT operators as x OR y=NOT(AND(NOT(x), NOT(y)) =1−(1−x)*(1−y).

As described above, the dialogue manager 162 selects an appropriate system response following the latest user input. The system outputs may be provided to the user as text or as speech. If the outputs are to be provided as speech, the dialogue manager 162 provides the system output text to a text-to-speech module 120. The text-to-speech (TTS) module 120 receives an orthographic text signal from the dialogue manager 162 and generates speech data based on the text signal. The generated speech data may represent speech audio wherein the words and/or characters of the orthographic text are pronounced in accordance with the pronunciation rules of the relevant natural language. The generated speech data may be one or more audio data items or one or more audio data streams. The TTS module 120 may provide text-to-speech functionality using any suitable method. For example, the text-to-speech functionality may be provided using any of concatenative synthesis, formant synthesis, Hidden Markov Model-based synthesis, and/or Deep learning-based synthesis. The TTS module 120 is an optional module which may be omitted. For example, where the system output is provided to the user as text, the TTS module 120 may be omitted.

The TTS module 120 may be implemented on a server computing device with speech audio being output on a client computing device. The speech data may be sent by the server computing device to the client computing device. The client computing device may receive the speech data and output the speech audio represented by the speech data using an audio output device forming part of the client computing device or connected thereto. The speech data may be output to the user as speech audio using an audio output device, e.g. a speaker or headphones or as text using a visual output device, e.g. a display. The output device may be connected to or form part of the computing device implementing the text-to-speech module 120, e.g. the output device may form part of the client computing device or be connected thereto.

The modules 110, 120, 140, 150, 160, 170 may be implemented as one or more computer programs. For example, all of the modules 110, 120, 140, 150, 160, 170 may be components of a single computer program. As another example, each of the modules 110, 120, 140, 150, 160, 170 may be implemented as individual computer programs communicating as to provide the desired functionality. As another example, a subset of the modules may be implemented as one computer program and the others of the modules may be implemented as one or more other computer programs. Any of the modules 110, 120, 140, 150, 160, 170 may also be implemented as a plurality of computer programs.

The modules 110, 120, 140, 150, 160, 170 may be implemented on a single computing device or may be implemented across a plurality of computing devices. For example, all of the modules 110, 120, 140, 150, 160, 170 may be implemented on one or more server computing devices, e.g. one or more local server computing devices and/or one or computing devices of a cloud computing service. All of the modules 110, 120, 140, 150, 160, 170 may be implemented on one or more client computing devices. Examples of client computing devices include: smartphones, feature phones, tablet computers, laptop computers, and/or desktop computers. One or more of the modules 110, 120, 140, 150, 160, 170 may be implemented on one or more client computing devices and the other(s) of the modules implemented on one or more server computing devices. For example, the automatic speech recognition module 110 and the text-to-speech module 120 may be implemented on a client computing device while the modules 140, 150, 160 and 170 may be implemented on one or more server computing devices.

In some examples, the system 100 is configurable and extensible. For example, the system 100 may use configurable modules for comparison of different types of values, for example text or dates. The system 100 can be extended by including modules configured for new data types.

The system 100 can also be configured for various languages. In order to extend the system 100 to a new language, the ASR module 110 and TTS module 120 for the current language may be replaced with ASR module 110 and TTS module 120 configured for the new language. The NLU module 140 may be replaced with an NLU module configured for the new language, or an additional translation module may be provided, to translate the output of the ASR module 110 to the previous language before it is provided to the NLU module 140. A natural language generation module may be included, to translate the scripted questions provided by the dialogue manager 162 to the new language.

Figure 2:
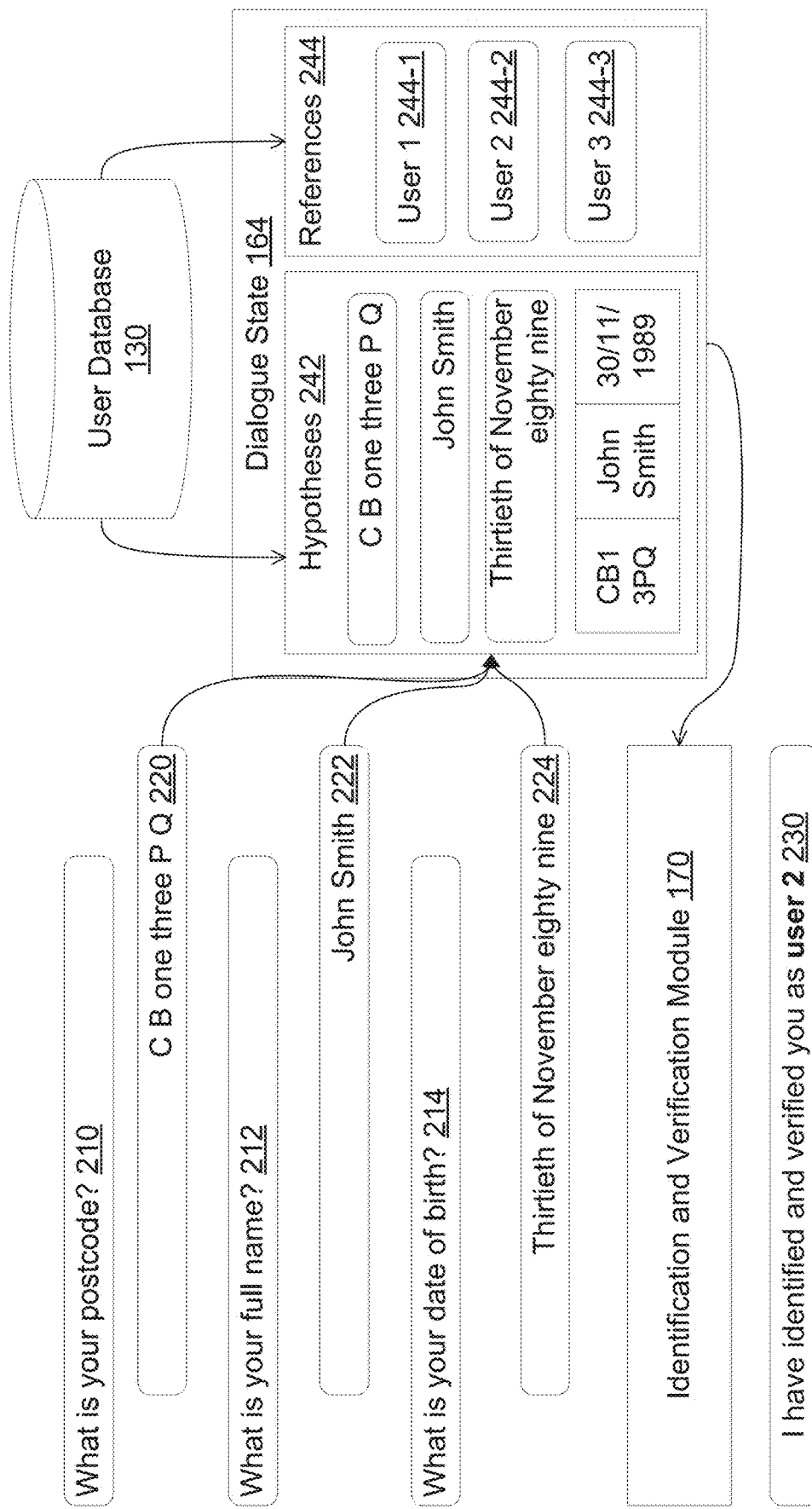
FIG. 2 illustrates an example dialogue in which a user is identified or verified in accordance with an embodiment.

FIG. 2 illustrates an example dialogue flow 200 in which a user is identified and verified in accordance with an embodiment. The system responses in the example dialogue flow may be generated by the system 100, as will be described below.

The dialogue flow 200 includes question asking steps 210-214, answer receiving steps 220-224 and confirmation step 240.

The dialogue state 164 is populated during the dialogue flow 200. The dialogue state 164 includes hypotheses 242 and references 244.

The answers received in the answer receiving steps 220-224 are used to populate the hypotheses 242. The answers are in the form of speech data, for example an audio signal received from a user device.

Details of registered users 234-1, 234-2, 234-3 are retrieved from the user database 130 and are used to populate the references 244.

The populated dialogue state 164 is received by the identification and verification module 170. The identification and verification module 170 identifies and verifies the user based on the dialogue state 164. The confirmation step 230 is then performed.

In step 210, the user is asked a question of "What is your postcode?" by the system.

In step 220, a response from the user to the question of 210 is received. In the illustrated example, the response "C B one three P Q" is received. This is transcribed by the ASR module 110 as "C B one three P Q". From this, a proposed value for the user data field "postcode" of "CB1 3PQ" is determined using the natural language understanding module 140. This proposed value for the postcode user data field is stored as part of the hypotheses information 242.

In step 212, the user is asked a question of "What is your full name?".

In step 222, a response from the user to the question of 212 is received. In the illustrated example, the response "John Smith" is received. This is transcribed by the ASR module 110 as "John Smith". From this, a proposed value for the user data field "name" of "John Smith" is determined using the natural language understanding module 140. This proposed value for the name user data field is stored as part of the hypotheses information 242.

In step 214, the user is asked a question of "What is your date of birth?".

In step 224, a response from the user to the question of 214 is received. In the illustrated example, the response "Thirtieth of November eighty nine" is received. This is transcribed by the ASR module 110 as "Thirtieth of November eighty nine". From this, a proposed value for the "date of birth" user data field of "30/11/1989" is derived using the natural language understanding module 140. This proposed value for the date of birth user data field is stored as part of the hypotheses information 242.

As described in relation to FIG. 1 above, as the proposed values are received from the NLU module 140, the dialogue manager 162 also issues API calls to query the user database 130 regarding registered users. Any possible matches are also stored in the dialogue state 164, as a list of candidate users. The references information 244 is therefore populated with a list of candidate users, which in this example comprises User 1 244-1, User 2 244-2 and User 3 244-3.

The dialogue state 164 is then sent to the identification and verification module 170 which identifies and verifies the user based on the hypotheses information 242 and the reference information 244. A non-greedy approach is used, in which the dialogue manager 162 first collects all information relevant to identification and/or verification and then provides the information to the identification and verification module 170. The information is provided to the identification and verification module 170 after the question asking steps are performed. The system executes the identification and/or verification after all relevant items have been collected. This non-greedy approach can increase recall and can also allow for dynamic domain adaptation, for example by biasing the ASR module 110 for candidate usernames, addresses, etc. The dialogue manager 162 also maintains N-best lists from all sub-components, including the ASR module 110, the phonetic processing module 150 (where used), the API results from the user database 130 for an identification task, and the value extraction module 142 for example. This can help to increase recall.

In the present case, the user is identified and verified as being 'User 2' 244-2. In the confirmation step 230, "I have identified and verified you as user 2" is output by the system.

FIG. 3 illustrates a method 300 for verifying a user according to an embodiment. The example method may be implemented as one or more computer-executable instructions executed on one or more computing devices, e.g. the computing device 700 described in relation to FIG. 7. The example method may be performed by the identification and verification system 100 described in relation to FIG. 1. Iterations are indicated via dotted lines.

For a verification task, the user is compared with a single candidate user, being the registered user that the system needs to verify against in order to perform some subsequent steps, which might be providing access to an authenticated system such as a user account for example.

At step 310, input data is received. The input data comprises speech data from a user.

At step 320, one or more hypotheses for each of a plurality of user data fields are derived from the speech data. The one or more hypotheses may be derived from the voice data using any of the methods described in relation to the system 100 of FIG. 1. For example, the one or more hypotheses for a given user data field may be derived from the speech data by performing automatic speech recognition, extracting values, and/or parsing the extracted values, for each user utterance. As described in relation to the natural language understanding module 140 of FIG. 1, multiple proposed values for a given user data field may be derived from the speech data because a value may be extracted for the given user data field for each of multiple ASR outputs an input user utterance. Multiple proposed values for a given user data field may alternatively or additionally be derived from the speech data because there may be multiple valid transformations of a value extracted from the speech data, as described in relation to the parser 144 of FIG. 1. For each user data field, a set of one or more hypotheses is stored, comprising the proposed value(s) and the ASR output(s) for example.

Steps 310 and 320 may be iterated several times, with the dialogue manager 162 providing an output to the user each iteration, requesting information to populate the user data fields. Once all of the user data fields required for verification are populated, the method moves to step S330.

For each candidate user and for each user data field, the system performs a comparison with all hypotheses. As has been described previously, the set of hypotheses includes one or more proposed values. The one or more proposed values include one or more extracted values. The one or more proposed values may additionally include one or more parsed values. The set of hypotheses may additionally include one or more ASR outputs.

Then, the system assigns the user data field a score corresponding to a float value in [0,1] for each candidate user, that indicates its similarity to the best matching hypotheses. A score of 1 indicates exact similarity; a score of 0 indicates strict dissimilarity; scores with values in between indicate levels of approximate similarity. The final score for each candidate user is calculated by evaluating a logical expression for all user data fields according to a fuzzy logic algebra.

At step 330, a score is calculated for the candidate user. Step 330 includes a user data field scores calculation step 332 and a fuzzy logic operations performance step 336. In this example, the candidate user is the registered user against which the user is to be verified. In other words, the method determines whether the user is verified as the registered user.

In step 332, a plurality of user data field scores are calculated. As part of step 332, a step 334 is performed for each of the plurality of user data fields.

In step 334, a user data field score is calculated using the one or more hypotheses for the data field. Where, for the user data field, there is one proposed value and one reference value for the candidate user then the user data field score may be calculated by performing a fuzzy comparison between the proposed value and the reference value for the candidate user. The user data field score may be the result of the fuzzy comparison, e.g. a fuzzy comparison score. The fuzzy comparison may be performed by applying a fuzzy comparison operator. Fuzzy comparison operators include fuzzy extensions of binary comparison operators. A binary comparison operator provides a binary output, for example a 1 (which indicates a match) and a 0 (which indicates a non-match). A fuzzy comparison operator provides an output with more than two possible states, indicating the degree of match, for example a value from 0 to 1. For example, an equality operator is a binary comparison operator, which outputs a 1 if the input text is the same as the reference text, and a 0 if the input text is not the same as the referenced text. The similarity operator, such as an edit distance, may be considered as a fuzzy extension of the equality operator, where the similarity operator outputs a value from 0 to 1 indicating the similarity between the input text and the reference text. As another example, the Python 'in' operator or the Java String 'contains' operator are binary comparison operators, which output a 1 if the reference text is contained within the input text and a 0 if the reference text is not contained within the input text. A fuzzy containment operator may be considered as a fuzzy extension of the Python 'in' operator, where the containment operator outputs a value between 1 and 0 indicating the extent to which the reference text is contained within the input text. In this example, the input text is the proposed value, however the input text may alternatively be the ASR output for example. The reference text is the reference value stored for the user data field.

Examples of fuzzy comparison operators include fuzzy text similarity operators, fuzzy text containment operators, and fuzzy date comparison operators. The result of applying a fuzzy comparison operator may be a fuzzy comparison score. A threshold may be applied to the fuzzy comparison score to obtain the user data field score, whereby the user data field score is set to zero if the fuzzy comparison score is below a threshold value. The threshold value may be different for different user data fields. For example, the threshold value for a name user data field may be in the range 0.5-0.66. Using a threshold value of 0.5 may provide greater recall whereas using a threshold value of 0.66 or higher may provide greater security.

One or more configurable fuzzy comparison operators may be provided. For example, the system may store a library of fuzzy comparison operators which may be suitable for different user data fields. For example, text comparisons based on similarity or containment, and based on orthographic text or phonetic text, can be included. Date comparisons based on orthographic text comparisons, phonetic text comparisons, or temporal comparisons can be included. Use of fuzzy logic algebra (AND, OR, NOT) can be used to combine the scores.

A fuzzy text similarity score is a measure of the similarity of the input text string to the reference value text string. A fuzzy text similarity operation may comprise a determination of an edit distance. An edit distance measures the closeness or similarity of the input text to the reference text in terms of the number of operations required to convert the input text into the reference text. The operations may comprise: insertion of a character, deletion of a character, or substitution of a character for example. An example fuzzy text similarity operation involves calculating the Levenshtein edit distance between the input text and the reference text value using the Wagner-Fisher algorithm, normalizing the Levenshtein edit distance by the length of the longer of the two texts to obtain a dissimilarity score, and subtracting the dissimilarity score from one to obtain a fuzzy similarity score. A score between 0 and 1 is generated, with a score closer to 1 indicating higher similarity. The fuzzy text similarity score may be used as a fuzzy comparison score. Although the Wagner-Fischer algorithm is described here as an example, alternative methods of performing an edit distance calculation may be used.

Calculating the edit distance is computationally expensive. The calculated edit distance and/or fuzzy text similarity score for a given input text string and a given reference value text string may be cached during or after the calculation of the fuzzy text similarity score. Thus, if a fuzzy text similarity score for these same two texts is requested then the cached edit distance and/or cached fuzzy text similarity score may be used. Hence, the edit distance and/or the fuzzy text similarity score is not recalculated and computational resources are consequently saved. The cache may have a limited capacity, e.g. the cache may be limited to storing a maximum number of edit distances and/or fuzzy text similarity scores, and/or using a maximum amount of memory. In this situation, the combinations of proved value text string and given reference value text string for which the fuzzy text similarity score is frequently requested, e.g. the edit distances and/or fuzzy text similarity scores frequently requested combinations may be kept in the cache whereas the edit distances and/or fuzzy text similarity scores for rarely requested combinations may be discarded from the cache.

A fuzzy text containment operator is a measure of the extent to which the reference value is contained within the input text (the hypothesis). Applying an example fuzzy text containment operator to two values including an input text and a reference value involves: performing a modified version of Seller's variant of the Wagner-Fischer algorithm to obtain an optimal Levenshtein edit distance and the span that would produce it; normalizing the Levenshtein edit distance by the maximum of the length of the span and the length of the reference value to get a 'not-containment' score; and subtracting the not-containment score from one to get a fuzzy text containment score. The fuzzy text containment score may be used as a fuzzy comparison score. The fuzzy text containment operator may comprise an approximate string search. Although Seller's algorithm is described here as an example, alternative methods of performing approximate string matching may be used.

The fuzzy text containment operator may be likely to return a higher value for a comparison of the reference value to an ASR output from the N-best list for example. For example, a user's name may be 'John Swymsphast', the ASR hypothesis may be "My last name is swims fast", and the name value extracted from the ASR hypothesis by the value extractor may be "Swims". A fuzzy comparison of the extracted name value with the reference value will have a low fuzzy comparison score. However, performing a fuzzy text containment operation on the user's name and the ASR hypothesis would result in a significantly higher fuzzy comparison score, as many characters of the user's name are contained in the ASR hypothesis. Performing a fuzzy text containment operation on a phonetic transcription of the user's name and a phonetic transcription of the ASR hypothesis may result in an even higher fuzzy comparison score as 'Swymsphast' and "swims fast" may be given similar or identical phonetic transcription.

In Seller's variant of the Wagner-Fischer algorithm, an m×n table is generated in the determination of the minimum edit distance between spans of the input text and the reference value as well as the length of the span from which this minimum edit distance was derived. m is the length of the reference value and corresponds to the number of rows in the table. n is the length of the input text and corresponds to the number of columns in the table. The entries in the first row of the table are set to zero. The rest of the table is populated in the same manner as defined in the Wagner-Fisher algorithm. The lowest value entry in the bottom row corresponds to the minimum edit distance. Where two entries in the bottom row have the same value, the entry corresponding to the shorter span can be selected for example. The selected entry in the bottom row gives the end-position of the match, and the edit distance. To determine the span corresponding to the match, the number of insertions and deletions is also stored during generation of the table. The Seller's variant of the Wagner-Fischer algorithm outputs the edit distance and the span length corresponding to the edit distance.

The modified version of Seller's variant of the Wagner-Fischer algorithm additionally generates a second m×n table, which stores the operations used to obtain the edit distance. Using the second m×n table, the exact span of the input text having the minimum edit distance may be obtained, making the calculated fuzzy containment score explainable.

Calculating the optimal edit distance is computationally expensive. The calculated optimal edit distance and/or the fuzzy text containment score for a given input and a given reference value string may be cached during or after the calculation of the fuzzy text containment score. Thus, if a fuzzy text containment score for these same two texts is requested then the cached optimal edit distance and/or cached fuzzy text containment score may be used. Hence, the optimal edit distance and/or the fuzzy text containment score is not recalculated and computational resources are consequently saved. The cache may have a limited capacity, e.g. the cache may be limited to storing a maximum number of optimal edit distances and/or fuzzy text containment scores, and/or using a maximum amount of memory. In this situation, the combinations for which the fuzzy text containment score is frequently requested, e.g. the optimal edit distances and/or fuzzy text containment scores for frequently requested combinations may be kept in the cache whereas the optimal edit distances and/or fuzzy text containment scores for rarely requested combinations may be discarded from the cache.

The fuzzy text similarity operator and/or fuzzy text containment operator may have one or more parameters. Various parameters of these operators may be configurable, for example max global errors, max errors in window, and a threshold. For example, the parameters may specify that at least every other character must match, or the comparison score for the input text and reference value is set to zero. As another example, if there are more than a maximum number of character differences between the input text and reference value then the comparison score is set to zero. As a further example, if an initially calculated comparison score does not meet a threshold then the resulting comparison score is set to zero. As an additional example, if within a given window, e.g. a continuous sequence of characters, of the reference value text and/or the input text, there are a number of differences (e.g. errors) exceeding a threshold then the resulting comparison score is set to zero.

Fuzzy date comparison operators may compare two dates based on the temporal difference between the two dates. For example, the fuzzy date comparison operator may calculate a fuzzy date similarity score based on a number of days, months, and/or years between the two dates. Fuzzy comparison operators for date comparisons are described in relation to FIG. 8.

Where dates are represented as an alphabetic, a numeric, or an alphanumeric string, fuzzy text comparison operators such as those described above may also be used for comparing dates.

Any combination of the above fuzzy comparison operators and any other fuzzy comparison operators can be used.

Where, for a user data field, multiple fuzzy comparison operators are used, the user data field score may be the maximum of the fuzzy comparison scores determined for the user data field. This is equivalent to performing an OR operation across the fuzzy comparison scores using Zadeh fuzzy logic. For example, where there is one proposed value and one reference value for a candidate user for the user data field, and a fuzzy text similarity and fuzzy text containment score are determined, then the user data field score is taken as the maximum of the fuzzy text similarity score and the fuzzy text containment score. Further constraints may be applied when determining the user data field score. An example of a further constraint might be that if the fuzzy text similarity score is below a predetermined threshold, the comparison score for the comparison of the proposed value and reference value is 0, regardless of the values of any other fuzzy comparison scores.

Where, for a user data field, there are multiple hypotheses and/or multiple reference values for the candidate user, a fuzzy comparison between each of the relevant value combinations is performed. For example, a fuzzy comparison between each of any proposed orthographic values and each of any reference orthographic values for the candidate user is performed. The user data field score is then taken as the maximum of these fuzzy comparison scores. Finding the maximum of these fuzzy comparison scores is equivalent to performing an OR operation using Zadeh fuzzy logic across these fuzzy comparison scores. An example of how a fuzzy comparison between any phonetic values may be performed will be described in more detail in relation to FIG. 6 below.

For example, where there is one proposed orthographic value and multiple reference orthographic values for the candidate user, a fuzzy comparison between the proposed value and each of the one or more reference values is performed. The user data field score is taken as the maximum of these fuzzy comparison scores. An example method for the calculation of a user data field score in a case where there are multiple proposed values is further described in relation to the example method 500 of FIG. 5.

Where there are multiple hypotheses, the fuzzy comparisons may be performed in order, for example in the order of the proposed values in the N-best or M-best list, e.g. the proposed value having the highest likelihood may be compared with the reference values first.

An early stopping procedure may be included in the determination of the user data field score where the Zadeh OR operator is used for combining the fuzzy comparison scores for the user data field. If one of the fuzzy comparison scores for the user data field is 1, it is not necessary to calculate the remaining fuzzy comparison scores, since only the maximum score will be used. Thus, an implementation using early stopping may be employed, in which if one of the fuzzy comparison scores for the user data field is 1, the remaining fuzzy comparison scores for the user data field are not calculated. This may save computational resource. By ordering the values such that the most likely hypotheses are compared first, it is more likely that a hypothesis for which the fuzzy comparison score is 1 is compared before others. Hence, early stopping is likely to occur earlier in the process of calculating the fuzzy comparison scores saving further computational resources.

For example, in an implementation using early stopping, a fuzzy comparison is performed between a proposed value for a user data field and a reference value for the candidate user to calculate a fuzzy comparison score. If the fuzzy comparison score is 1, then this fuzzy comparison score is used as the user data field score and no further fuzzy comparison scores are determined for the user data field for the candidate user. Otherwise, further fuzzy comparison scores may be determined, for example using different fuzzy comparison operations, other hypotheses for the user data field or other reference values for the candidate user for the user data field for example. If each of the fuzzy comparisons are performed for each of the relevant combinations of the hypotheses and reference values, and none of the resulting fuzzy comparison scores are 1, then the maximum of the fuzzy comparison scores is taken as the user data field score.

In step 336, one or more fuzzy logic operations are performed on the plurality of user data field scores for the candidate user. The one or more fuzzy logic operations may be any of the fuzzy logic operations described in relation to the fuzzy logic module 174 of FIG. 1. The result of performing the one or more fuzzy logic operations on the plurality of user data field scores is a score for the candidate user.

Early stopping may be used in determining the score for the candidate user where the Zadeh operators are being used for performing fuzzy logic. This may save computational resources. An example implementation using early stopping and the Zadeh operators for fuzzy logic will now be described.

The score for the candidate user is determined by performing one or more fuzzy OR operations and/or one or more fuzzy AND operations on the user data field scores.

A fuzzy OR operation is applied to two inputs. The two inputs may be two user data field scores; two results of fuzzy logic operations on user data field scores; and/or a user data field score and a result of a fuzzy logic operation on user data field scores. One of these inputs may be calculated before the other, e.g. a user data field score may be calculated before another user data field score or one fuzzy logic operations may be performed before another. If the first computed of the two inputs is 1, then the result of the OR operation (the maximum of these values) will be 1. Hence, the first of these computed inputs may be used as the result of the fuzzy OR operation without computing the other input.

A fuzzy AND operation is applied to two inputs. The two inputs may be two user data field scores; two results of fuzzy logic operations on user data field scores; and/or a user data field score and a result of a fuzzy logic operation on user data field scores. One of these inputs may be calculated before the other, e.g. a user data field score may be calculated before another user data field score or one fuzzy logic operations may be performed before another. If the first computed of the two inputs is 0, then the result of the AND operation (the minimum of these values) will be 0. Hence, the first of these computed inputs may be used as the result of the fuzzy OR operation without computing the other input. As was described previously in relation to step 334, the user data field score calculation module 172 may apply a threshold to the user data field score such that calculated user data field scores below a specified value are set to zero. If this has occurred, then early stopping may take place during calculation of the score for the candidate user.

A further example of early stopping is described below. In this example, the logical expression for calculating the total candidate user score is:

$$(\text{Score(Name) AND Score(Postcode)) AND Score(Telephone Number)}$$

Score (Name) is the score for the 'Name' user data field. Score (Postcode) is the score for the 'Postcode' user data field. Score (Telephone Number) is the score for the 'Telephone Number' user data field.

If the (Score (Name) is 0 then the total user score must be 0, as the total score is the minimum of the user data field scores. In this case, computation of the logical expression may be skipped, and (Score (Name)

The resulting candidate user score indicates the confidence level that the information provided is adequate to verify the user as the registered user. To provide a binary output of whether the user is verified or not, a further step of checking whether the candidate user score is above or below a threshold may be performed, as described below.

At step 340, it is determined whether the score for the at least one candidate user meets a verification threshold. In some implementations, the score for the at least one candidate user may meet the verification threshold if it is greater than the verification threshold. In some implementations, the score for the at least one candidate user may meet the verification threshold if it is greater or equal to the verification threshold.

The verification threshold may be a value greater than the minimum possible score and less than the maximum possible score. For example, the score may be in the range 0 to 1 (inclusive) with 0 being the minimum possible score and 1 being the maximum possible score, and the verification threshold may be a value between 0 and 1.

The verification threshold may be set according to security requirements and/or usability requirements, e.g. security requirements and/or usability requirements of a system to which authenticated access is being provided. The threshold can be adjusted to choose a desired operation point for a trade-off between a security level and a level of recall. For example, the security requirements for a telephone help IVR system may be lower than that for an e-banking IVR system, so the verification threshold used for a telephone help system may be lower than that used for an e-banking IVR system.

Higher verification thresholds provide greater levels of security but may impair usability of the system, as non-exact matches resulting from ASR errors are more likely to cause verification to fail. Thus, the legitimate user may need to reattempt verification multiple times to gain access to the system or, at worst, may not be able to gain access to the system. Lower verification thresholds provide lower levels of security but improve the usability of the system as minor ASR errors are less likely to cause verification to fail. Thus, the user may be able to access the system in one attempt or at least in fewer attempts as compared to a system using a higher verification threshold.

Where the score is in the range 0 to 1, the verification threshold may be in the range of 0.66-0.9 for example. A verification threshold of 0.66 may provide enhanced usability, whereas a verification threshold of 0.9 may provide enhanced security.

In addition to determining whether the score for the at least one candidate user meets the verification threshold, it may be determined whether one or more further verification thresholds are met with a level of confidence in the verification depending on whether the one or more verification thresholds. The one or more further verification thresholds may have values greater than the verification threshold and may correspond to higher levels of confidence.

At step 350, in response to determining that the score for the candidate user meets the verification threshold, it is verified that the user is the candidate user.

Where one or more further verification thresholds are used, a level of confidence for the verification may be assigned For example, if the score does not meet the verification threshold then the user has not been verified; if the score meets the verification threshold but not the one or more further verification thresholds then the user has been verified with a moderate confidence; and if the score meets the one or more further verification thresholds then the user has been verified with a higher confidence. Where the one or more further verification threshold are a plurality of further verification thresholds then the score meeting those of the plurality of further verification thresholds with greater values may correspond to higher levels of confidence in the verification. The level of confidence in the verification may be stored for auditing and/or debugging purposes.

At optional step 360, a confirmation that an identity of the user has been verified is outputted to the user. The candidate user score or level of confidence in the verification may be outputted to the user.

At optional step 370, access is provided to an authenticated system. The authenticated system may be a further IVR system. For example, the authenticated system may be a voice-based search IVR system, a recommendation IVR system, a booking IVR system, a telephone help IVR system, a customer service IVR system, and/or an e-banking IVR system.

If it is determined that the score for the candidate user does not meet the verification threshold, it is not verified that the user is the candidate user. An optional step of informing the user that the identity of the user has not been verified may be performed. Access is not provided to the authenticated system. The system may take some further action, such as handing over to a human operator.

Where one or more further verification thresholds are used, the degree of access provided to the authenticated system may depend on the level of confidence in the verification. For example, in an e-banking IVR system, the balance of a bank account may be provided where there is a medium level of confidence or greater in the verification, e.g. the verification threshold is met, but, to perform a money transfer, a greater level of confidence in the verification may be required, e.g. the one or more further verification thresholds may need to be met. If the verification is not at the required level of confidence to perform the operation then the verification process or parts thereof may be repeated such that the user may be verified at the required level of confidence, or, the user may be transferred to a human operator who can perform the verification manually.

In the above described method, fuzzy logic allows soft verification with approximately matching information. Fuzzy logic quantifies the uncertainty of the approximate matches, so that a verification threshold representing the desired recall/security trade-off for the application can be used.

FIG. 4 illustrates an example method 1400 for identifying a user according to an embodiment. The example method may be implemented as one or more computer-executable instructions executed on one or more computing devices, e.g. the computing device 700 described in relation to FIG. 7. The example method may be performed by the identification and verification system 100 described in relation to FIG. 1. Iterations are indicated via dotted lines.

At step S410, input data is received. The input data comprises speech data from a user.

At step S420, one or more hypotheses for each of a plurality of user data fields are derived from the speech data. The one or more hypotheses for each of the plurality of user data fields may be derived using any of the methods described in relation to step 320 of FIG. 3.

Once the proposed values have been collected, for each candidate user of a plurality of candidate users, step S430 is performed. In step S430, a score is calculated for the respective candidate user. Step S430 includes a user data field scores calculation step S432 and a fuzzy logic operations performance step S436.

In step S432, a plurality of user data field scores are calculated for the candidate user. As part of step S432, a step S434 is performed for each of the plurality of user data fields. In step S434, a user data field score is calculated using the one or more proposed values for the user data field, the ASR output, and the one or more reference values for the at least one candidate user for the user data field. User data field scores may be calculated using any of the methods described in relation to step 334 of FIG. 3. As described in relation to step 334, a threshold may be applied to a fuzzy comparison score to obtain the user data field score, whereby the user data field score is set to zero if the fuzzy comparison score is below a threshold value.

In step S436, one or more fuzzy logic operations are performed on the plurality of user data field scores. The one or more fuzzy logic operations performed on the plurality of user data field scores may be any of the fuzzy logic operations described in relation to step 336 of FIG. 3 and may be performed in the same or a similar manner.

At step S440, a candidate user of the plurality of candidate users having a maximum score is determined.

At step S450, the user is identified as the candidate user having the maximum score. An early stopping implementation may be performed, in which if a score for a candidate user is determined as 1, no further candidate user scores are determined, and the candidate user is identified as the user.

For the identification task, the candidate users are ranked according to their computed fuzzy scores. The ranking in the list and the score indicates the confidence that the system has identified the correct user. The top-ranking candidate user is considered as the best match for the identity of the system's user. The rest of the items can also be provided as an output if a subsequent application requires an n-best list of candidate identities for example.

If the list is empty, the system concludes that the user could not be identified. An optional step of providing an output to the user indicating that they could not be identified is performed. The system may take some further action, such as handing over to a human operator. Access to an authenticated system is not provided.

In tandem with or subsequent to identifying the user, verification may be performed in the manner described in relation to steps 340 and 350 of FIG. 3. For example, it may be determined whether the score of the identified user meets a verification threshold, and the user is verified if the score of the identified user meets the verification threshold.

At optional step S460, a confirmation that the user has been identified is provided. Where the user is additionally being verified, the optional step S460 may be performed in response to the user being verified in addition to identified, e.g. the user must be both identified and verified for the confirmation to be provided.

At optional step S470, access to an authenticated system may be provided. The authenticated system may be any of the authenticated systems described in relation to step 370. Where the user is additionally being verified, the optional step S470 may be performed in response to the user being verified in addition to identified, e.g. the user must be both identified and verified for access to the authenticated system to be provided.

FIG. 5 illustrates an example method 500 for calculating a user data field score which may be used in a method according to an embodiment. The example method may be implemented as one or more computer-executable instructions executed on one or more computing devices, e.g. the computing device 700 described in relation to FIG. 7. The example method may be performed by the identification and verification system 100 described in relation to FIG. 1, e.g. by the user data field score calculation module 152. Iterations are indicated via dotted lines.

At step 510, a plurality of hypotheses are derived for the user data field. The plurality of hypotheses may be derived from the speech data using any of the methods described in relation to the system 100 of FIG. 1 and/or any of the methods described in relation to step 320 of FIG. 3 for example. For example, where the ASR module 110 outputs multiple ASR outputs corresponding to the user input, a proposed value corresponding to each ASR hypothesis may then be extracted for the user data field by the NLU module 140.

At step 520, one or more hypothesis scores are calculated. As part of step 520, a step 522 is performed for each of one or more of the plurality of hypotheses. The step 522 may be performed for each of the hypotheses in the order in which the hypotheses are provided. For example, the proposed values are provided to the identification and verification module 170 in the order of the N-best list output from the ASR module 110. The proposed value scores are then determined in this order. Where the ASR output is also used in the determination of the user data field score, a score is also generated for each of the ASR outputs corresponding to the user data field, in the same manner as the proposed value scores are calculated.

In step 522, a hypothesis score is calculated. The hypothesis score may be calculated in accordance with the methods described in relation to step 334 of FIG. 3. In this step, a fuzzy comparison score is generated using each of the implemented fuzzy comparison operators and each of the relevant reference values. Where there are multiple relevant reference values for the user data field for the candidate user, early stopping may be performed during the calculation of the hypothesis score in accordance with methods described in relation to step 334 of FIG. 3.

Early stopping may be employed in the calculation where the Zadeh operators are being used for performing fuzzy logic. Where a hypothesis score is 1, further hypothesis scores for the user data field are not calculated, which may save computational resources. For example, a first hypothesis score is calculated for a first of the plurality of hypotheses by performing step 522. If the hypothesis score is 1 then no further hypothesis scores are computed. By calculating the hypothesis scores in the order corresponding to that of the N-best list output from the ASR module, it is more likely that early stopping may be used.

Where the one or more hypothesis scores are one proposed value score, the user data field score is the one hypothesis score.

Where the one or more hypothesis scores are a plurality of hypothesis scores, step 530 is performed. At step 530, the maximum of the hypothesis scores is taken as the user data field score. This corresponds to application of fuzzy OR Zadeh operators.

FIG. 6 illustrates an example method 600 for deriving a user data field score which is used in a method according to an embodiment in which a phonetic comparison is performed. The example method may be implemented as one or more computer-executable instructions executed on one or more computing devices, e.g. the computing device 700 described in relation to FIG. 7. The example method may be performed by the identification and verification system 100 described in relation to FIG. 1, e.g. by the phonetic processing module 140. Iterations are indicated via dotted lines. In this example, orthographic fuzzy matching is complemented with phonetic fuzzy matching. In alternative examples, phonetic fuzzy matching may be performed without orthographic fuzzy matching.

At step 610, one or more reference phonetic values are obtained for the user data field for the candidate user. The one or more reference phonetic values may be obtained using the ASR module 110 or the phonetic processing module 150, or the reference phonetic values may be stored for the candidate user in advance and retrieved in step 610.

In this example, step 610 includes a grapheme to phoneme conversion step 612. In step 612, a grapheme to phoneme conversion is performed on one or more orthographic reference values corresponding to the user data field. The grapheme to phoneme conversion may be performed using any of the methods described in relation to the phonetic processing module 150 in relation to FIG. 1. The result of the grapheme to phoneme conversion may be a phonetic text value, e.g. a text value in a phonetic alphabet such as the International Phonetic Alphabet or Speech Assessment Methods Phonetic Alphabet (SAMPA). Step 612 may include performing step 614 for each of at least a subset of the one or more orthographic reference values. In step 614, one or more phonetic reference values are derived from each orthographic reference value. A plurality of phonetic text values may be derived from each of the orthographic text values.

At step 620, a phonetic user data field score for the user data field is calculated based on the obtained one or more phonetic reference values and a set of one or more proposed phonetic values and/or one or more phonetic texts. Phonetic values and phonetic text are obtained in the manner described in relation to FIG. 1 above. The same fuzzy similarity and containment text operators described above can be used to compare phonetic text. The phonetic user data field score may be calculated using any of the techniques described in relation to the step 332 of FIG. 3 and/or the method 500 of FIG. 5. Fuzzy phonetic text operators, including similarity and/or fuzzy containment operators, can be used to compare the proposed phonetic values or text with the reference phonetic values. Proposed phonetic values or text can be obtained using speech-to-phoneme based speech recognition or reconstructed using the phonetic processing module 150. Various parameters of these operators may be configurable, for example max global errors, max errors in window, and the threshold as described above. For example, the parameters may specify that at least every other phoneme must match, or the comparison score for the proposed phonetic value and reference phonetic value is set to 0. As another example, if the result of the similarity or containment operator is a score below a threshold then the comparison score is set to 0. For example, for a phonetic name field, the threshold may be a value in the range 0.5-0.66.

At step 620, an orthographic user data field score for the user data field is also calculated based on the one or more orthographic reference values and the proposed one or more orthographic values and ASR output. The orthographic user data field score for the user data field may be calculated using any of the techniques described in relation to the step 332 of FIG. 3 and/or the method 500 of FIG. 5.

At optional step 630, a fuzzy logic operation is performed on the phonetic user data field score and the orthographic user data field score. The fuzzy logic operation may be a Zadeh fuzzy OR operation. The result of applying the fuzzy OR operator to the phonetic user data field score and the orthographic user data field score is the maximum of these user data field scores.

In the above described example, one or more proposed phonetic values and/or phonetic texts are included in the set of hypotheses. The hypotheses comprising phonetic text or values are used to determine a phonetic user data field score and the hypotheses comprising orthographic text or values are used to determine an orthographic user data field score. The proposed phonetic values may be generated from the proposed orthographic values. The phonetic texts may be generated from the orthographic ASR outputs, or the ASR module may alternatively extract the phonetic texts directly from the user input.

An example of the calculation of candidate user scores in an identification and verification scenario is now described.

In the example scenario, details of two registered users have been obtained from a user database in response to the obtained proposed values. The first registered user has an orthographic reference value for the "first name" user data field of 'John' and an orthographic reference value for the "surname" user data field of 'Smith'. The second registered user has an orthographic reference value for the "first name" user data field of 'Joan' and an orthographic reference value for the "surname" user data field of 'Schmidt'. References are built for each of these users from information in the user database 130. A reference User_1 is built for the first user. A reference User_2 is built for the second user. This may be represented using pseudo-code as follows:

User_1={name: John, surname: Smith}→[Reference (first_name=John), Reference(surname=Smith)]
User_2={name: Joan, Surname: Schmidt}→[Reference (first_name=Joan), Reference (surname=Schmidt)]

The system then builds hypotheses based on the proposed values extracted from the dialogue flow with the user using the techniques previously described. In the example scenario, the user utterance is "My name is John Smith", and the output of the ASR is "My name is Jo Smith", where in this example, N=1. From this the proposed value 'Jo' is extracted for the user data field "name" and the proposed value 'Smith' is extracted for the user data field surname by the NLU module 140. A hypothesis is built from these extracted values. This may be described using pseudo-code as follows:

Utterance="My name is Jo Smith"→[Extracted (first_name=Jo), Extracted (surname=Smith)]→[Hypothesis (first_name=Jo), Hypothesis (surname=Smith)]

In this example, N=1 and therefore a single proposed orthographic value is extracted for each of the two user data fields used by the identification and verification. Phonetic comparison is not used, and therefore a single proposed orthographic value is extracted for each user data field. Comparison of the ASR output is also not used.

The system then evaluates user data field scores for each user data field and each candidate user. Hence, 'first name' and 'surname' user data field scores are calculated for both of the candidates User_1 and User_2.

In the example scenario, the 'first name' user data field score is 0.5 for User_1 and 0.5 for User_2; and the 'surname' user data field score is 1.0 for User_1 and 0.2 for User_2. This may be described using pseudo-code as follows:

score_first_name(User_1)=best_score(first_name hypothesis matches first_name reference for User_1) =0.5 (score of 'Jo' hypothesis matching with 'John' reference)
score_first_name(User_2)=best_score(first_name hypothesis matches first_name reference for User_2) =0.5 (score of 'Jo' hypothesis matching with 'Joan' reference)
score surname(User_1)=best_score(surname hypothesis matches surname reference for User_1)=1.0 (score of 'Smith' hypothesis matching with 'Smith' reference)
score surname (User_2)=best_score(surname hypothesis matches surname reference for User_2)=0.2 (score of 'Jo' hypothesis matching with 'Joan' reference)

The system then combines the scores for the user data fields to get a total score for each user. In the example scenario, the logical expression comprises applying a fuzzy 'AND' operator to the 'first name' user data field score and the 'surname' user data field score. This may be represented in pseudo-code as follows:

score(user)=score_first_name(user) AND score surname (user)

The system then applies fuzzy logic algebra to evaluate the result for each user. In the present example, a score of 0.5 for User_1 and a score of 0.2 for User_2 is obtained. This may be represented in pseudo-code as follows:

score (User_1)=0.5 (first name score) AND 1.0 (surname score)=0.5
score (User_2)=0.5 (first name score) AND 0.2 (surname score)=0.2

The derived scores may then be used for identification and/or verification.

In the case of verification, in this example the verification threshold has been set to 0.3. In this case, User_1 would be verified as its score of 0.5 exceeds the threshold of 0.3 but User_2 would not be verified as its score of 0.2 does not meet the threshold of 0.3. This may be represented in pseudo-code as follows:

Verify(User_1)=bool (0.5>threshold)=True (verified)
Verify(User_2)=bool (0.2>threshold)=False (not verified)

In the case of identification, the user would be identified as the one of the users User_1 and User_2 having the maximum score. User_1 has a score of 0.5 while User_2 has a score of 0.2, so User_1 would be identified as the user.

Figure 7:
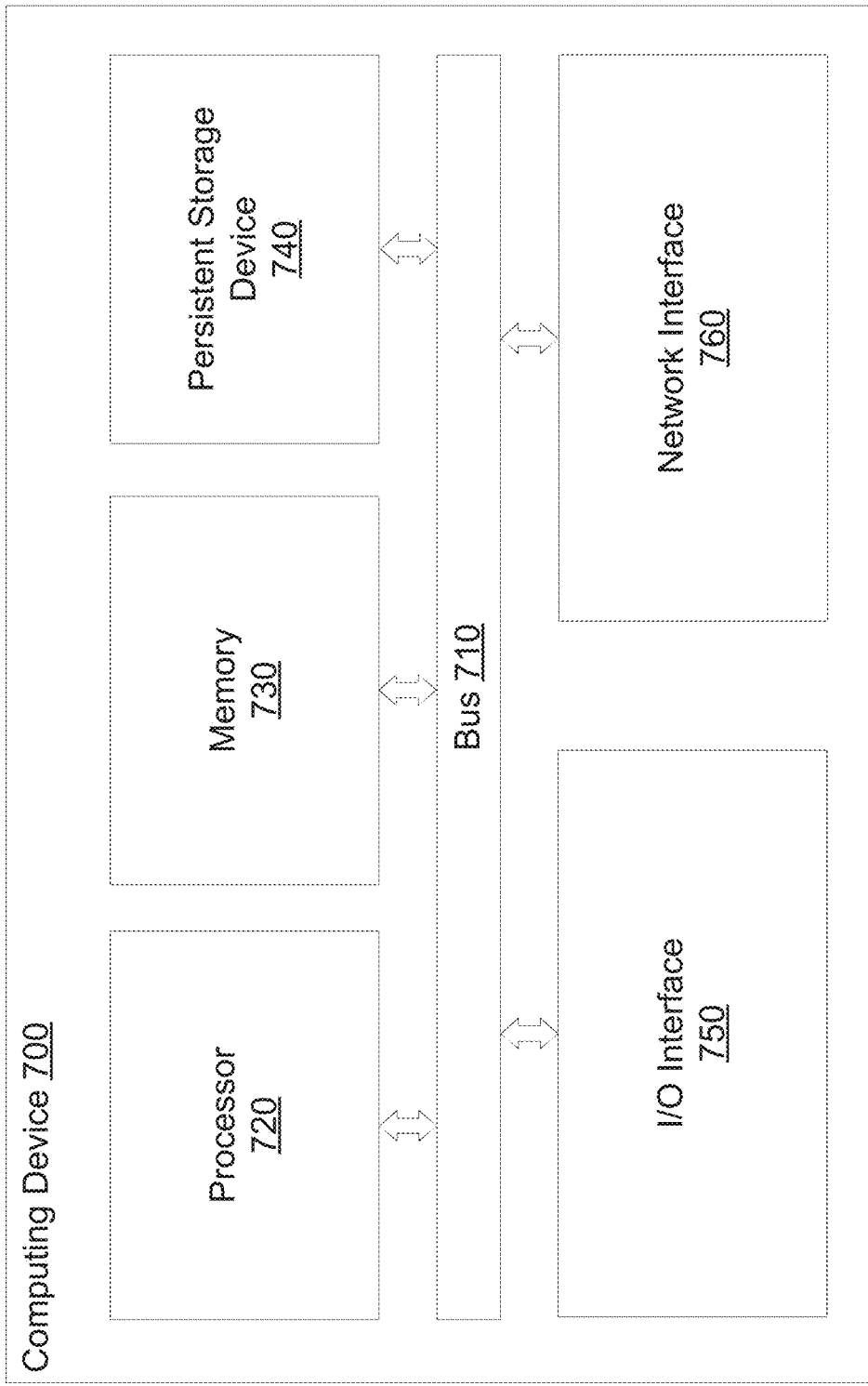
FIG. 7 shows a computing device on which the embodiments described herein may be implemented.

FIG. 7 shows a computing device 700 on which the embodiments described herein may be implemented.

The computing device 700 includes a bus 710, a processor 720, a memory 730, a persistent storage device 740, an Input/Output (I/O) interface 750, and a network interface 760.

The bus 710 interconnects the components of the computing device 700. The bus may be any circuitry suitable for interconnecting the components of the computing device 700. For example, where the computing device 700 is a desktop or laptop computer, the bus 710 may be an internal bus located on a computer motherboard of the computing device. As another example, where the computing device 700 is a smartphone or tablet, the bus 710 may be a global bus of a system on a chip (SoC).

The processor 720 is a processing device configured to perform computer-executable instructions loaded from the memory 730. Prior to and/or during the performance of computer-executable instructions, the processor may load computer-executable instructions over the bus from the memory 530 into one or more caches and/or one or more registers of the processor. The processor 720 may be a central processing unit with a suitable computer architecture, e.g. an x86-64 or ARM architecture. The processor 720 may include or alternatively be specialized hardware adapted for application-specific operations.

The memory 730 is configured to store instructions and data for utilization by the processor 720. The memory 730 may be a non-transitory volatile memory device, such as a random access memory (RAM) device. In response to one or more operations by the processor, instructions and/or data may be loaded into the memory 730 from the persistent storage device 740 over the bus, in preparation for one or more operations by the processor utilising these instructions and/or data.

The persistent storage device 740 is a non-transitory non-volatile storage device, such as a flash memory, a solid state disk (SSD). or a hard disk drive (HDD). A non-volatile storage device maintains data stored on the storage device after power has been lost. The persistent storage device 740 may have a significantly greater access latency and lower bandwidth than the memory 730, e.g. it may take significantly longer to read and write data to/from the persistent storage device 740 than to/from the memory 730. However, the persistent storage 740 may have a significantly greater storage capacity than the memory 730.

The I/O interface 750 facilitates connections between the computing device and external peripherals. The I/O interface 750 may receive signals from a given external peripheral, e.g. a keyboard or mouse, convert them into a format intelligible by the processor 720 and relay them onto the bus for processing by the processor 720. The I/O interface 750 may also receive signals from the processor 720 and/or data from the memory 730, convert them into a format intelligible by a given external peripheral, e.g. a printer or display, and relay them to the given external peripheral.

The network interface 760 facilitates connections between the computing device and one or more other computing devices over a network. For example, the network interface 760 may be an Ethernet network interface, a Wi-Fi network interface, or a cellular network interface.

Figure 8:
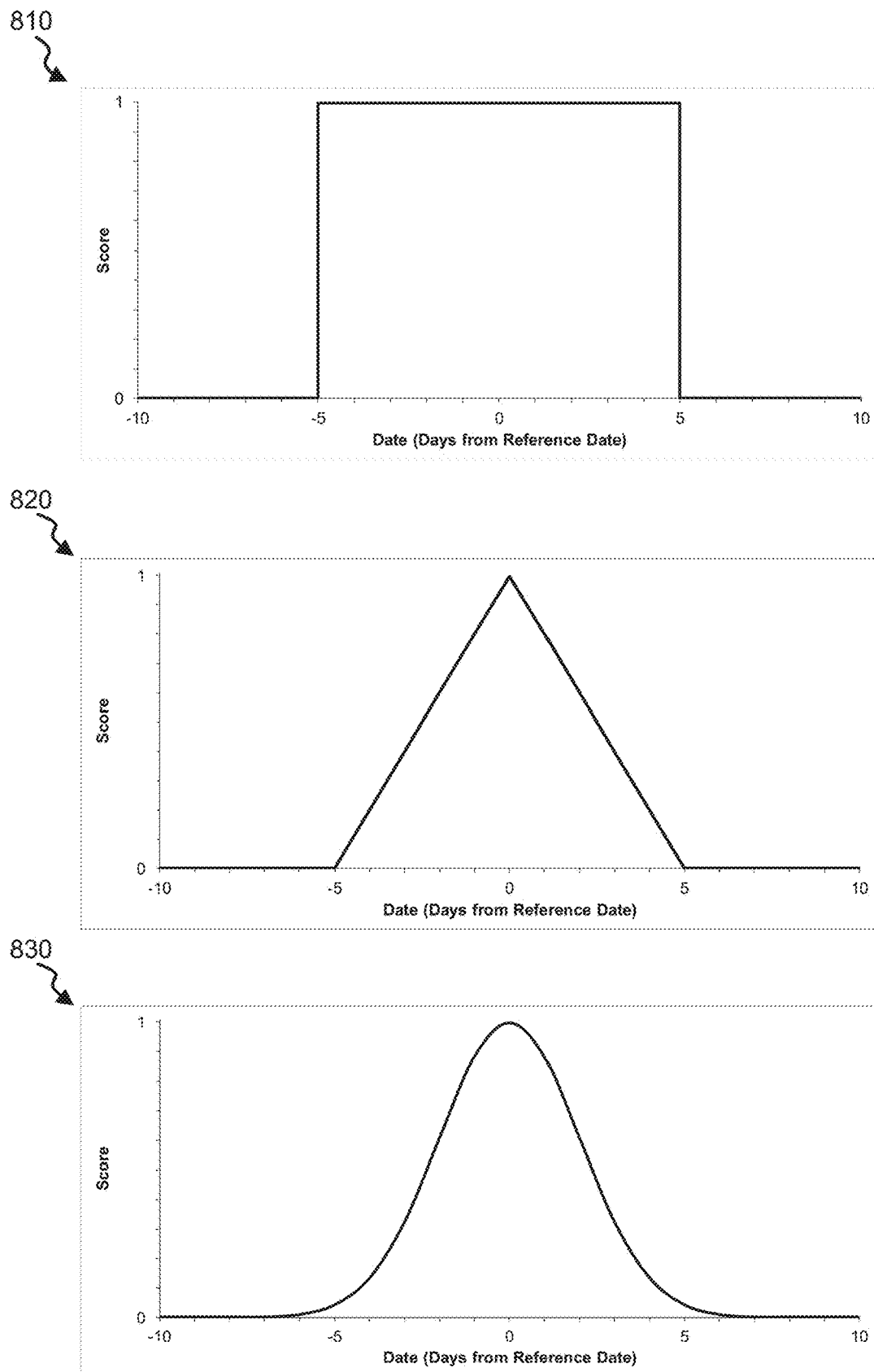
FIG. 8 illustrates examples of fuzzy date comparison operators that may be used in a method according to an embodiment.

FIG. 8 illustrates examples of temporal date comparison operators that may be used in the above described methods.

For each of the temporal date comparison operators illustrated, a date is compared to a reference date. The date being compared is derived from a voice input, the reference date is a date for a user data field for a candidate user.

In each of the graphs, the X-axis indicates the number of days from the reference date with 0 indicating the reference date, n indicating n days after the reference date and —n indicating n days before the reference date. For example, 5 represents five days after the reference date, whereas −5 represents five day before the reference date.

In each of the graphs, the Y-axis represents a comparison score having a value between one and zero.

Graph 810 illustrates a first binary-valued temporal date comparison operator. This first temporal binary-valued date comparison operator is a step temporal date comparison operator, where dates which are the same as the reference date and dates within a given number of days of the reference date are given a score of one and other dates are given a score of zero. In the specific example illustrated in graph 810, dates within five days of the reference date are given a score of 1, whereas dates more than five days from the reference date are given a score of 0.

Graph 820 illustrates a second temporal fuzzy date comparison operator. This second temporal fuzzy date comparison operator is a triangular temporal fuzzy date comparison operator, where dates which are the same as the reference date are given a score of one with the score linearly decreasing to zero at a specified number of days from the reference date. Dates more than the specified number of days from the reference date are also given a score of zero. In the specific example illustrated in graph 820, the score linearly decreases from one at the reference date to zero at five days from the reference days, e.g. at five days after the reference date and five days before the reference date.

Graph 830 illustrates a third temporal fuzzy date comparison operator. This third temporal fuzzy date comparison operator is a bell curve temporal fuzzy date comparison operator. The illustrated bell curve temporal fuzzy date comparison operator may be a rescaling of a probability density function normal distribution with a mean of zero, e.g. centred at the reference date, a specified standard deviation, and rescaled such that its maximum value is one. The specific example illustrated in graph 830 has a standard deviation of two.

While the above described temporal date comparison operators are symmetric with respect to the reference date, e.g. having the same score for n days after the reference date and n days before the reference date, temporal fuzzy date comparison operators that are asymmetric with respect to the reference date are also envisaged. An example of an asymmetric temporal comparison operator is a step temporal date comparison operator where dates which are the same as the reference date and dates up to a first number of days after the reference date are given a score of one, dates up to a different, second number of days before the reference date are also give a score of one, and other dates are given a score of zero. Another example of an asymmetric temporal fuzzy comparison operator is a triangular temporal fuzzy comparison operator, where dates which are the same as the reference date are given a score of one with the score linearly decreasing to zero at a first number of days after the reference date, and the score linearly decreasing to zero at a second, different number of days before the reference date. Dates more than the first number of days after the reference date and more than the second, different number of days before the reference date are also given a score of zero.

A threshold may be applied to any score calculated using the above described temporal fuzzy date comparison operators, whereby any scores below the threshold are set to zero. For example, a threshold may be applied to a score calculated using the operator illustrated in graph 830 such that any scores less than 0.5 are set to zero.

In the above described examples, the dialogue manager receives information including the proposed value(s) for a user data field from the natural language understanding module. The dialogue manager generates a set of one or more candidate hypotheses. For example, the set may comprise a candidate hypothesis corresponding to each proposed value, in the order of the ASR list from which the proposed values were determined. As described previously, the proposed values may comprise extracted values and parsed values. The set of hypotheses may comprise the parsed values listed above the extracted values. In some examples, the dialogue manager additionally receives the ASR output for the user data field. The set of hypotheses may further comprise the ASR output, listed after the proposed values, in the order of the ASR output (the N-best list). The set of hypotheses is provided to the identification and verification module. In some examples, the identification and verification obtains phonetic text or values corresponding to one or more of the hypotheses, and includes the obtained phonetic text or values into the set. A user data field score is then obtained as the maximum comparison score between a hypothesis in the set and a reference value. In some alternative examples, the value extraction module is omitted, and the set of hypotheses comprises the ASR output without any proposed values.

The above described system implements a task of voice-based, non-biometric, knowledge-based identification and verification. Identification and/or verification can be used as a component of a task-oriented spoken dialogue system that offers personalised and privacy-focused services. The system can identify and verify a user against a known database of registered users, based on information collected through dialogue interaction. The information might include one or more of: the user's postcode, name, date-of-birth, passphrase etc. The system collects the user information through a multi-turn dialogue interaction, and compares it against reference user information contained in a database. The system populates reference values for candidate users from API calls to query a database of candidate users. Grapheme to phoneme transformation may be performed where phonetic matching is used. Proposed values are obtained using ASR and NLU, and grapheme to phoneme transformation where phonetic matching is used. The system tracks n-best lists for the various modules, including ASR 110, NLU 140, and the phonetic processing module 150.

In some examples, the system is configurable. The rules for identification and verification are defined in the logical expression syntax, and can be modified depending on the application. In particular, the logical expressions that relate the user data fields (e.g. postcode AND (first name OR last name)) can be modified for different applications. In order to configure the system for a particular application, a list of user data fields that will act as identification and verification criteria is defined. The parameters of the comparison mechanism can also be selected, for example whether to use similarity and containment matching, or whether to use phonetic matching. A library of parameterisable fuzzy comparison functions for each user data field can be provided, including phonetic matching and approximate string matching. Fuzzy logic algebra is used to combine the individual user data field scores into a user score for each candidate user. This score can then be used for the purposes of verification, by comparing to a pre-defined threshold that controls the security/recall trade-off, or identification, by ranking the candidate users. The identification and verification tasks are performed using a logical expression to be evaluated according to fuzzy logic.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A computer-implemented dialogue method comprising:
obtaining, by way of an input, input data relating to speech provided by a user;
deriving, from the input data relating to speech provided by a user, one or more hypotheses for each of a plurality of user data fields corresponding to knowledge based authentication factors, wherein deriving the one or more hypotheses comprises:
  performing automatic speech recognition on the input data to generate text from the input data; and
  determining, from the text generated, one or more proposed values for each of the plurality of user data fields,
  wherein the one or more hypotheses comprise the one or more proposed values for each of the plurality of user data fields;
obtaining one or more reference values for each of the plurality of user data fields for each of one or more candidate users;
calculating a score for at least one candidate user of the one or more candidate users, calculating the score comprising:
  calculating a plurality of user data field scores comprising, for each of the plurality of user data fields, a respective user data field score, by comparing the one or more hypotheses and the one or more reference values for the candidate user for the respective user data field;

performing one or more fuzzy logic operations on the plurality of user data field scores;

using the score for a candidate user of the one or more candidate users to perform a verification or identification process for the user;

verifying or identifying the user based on the verification or identification process using the score for the candidate user; and providing, in response to verifying or identifying the user based on the verification or identification process using the score for the candidate user, access to an authenticated conversational system, the providing access to an authenticated conversational system comprising employing an authenticated interactive voice response (IVR) system to interact with the user.

2. The method of claim 1, further comprising:
determining whether the score for the candidate user of the one or more candidate users meets a threshold.

3. The method of claim 2, wherein the one or more candidate users is a single candidate user and the score for the candidate user is used to perform a verification process for the user, wherein using the score for the candidate user to perform the verification process comprises, in response to determining that the score for the candidate user meets the threshold, verifying that the user is the candidate user.

4. The method of claim 1, wherein the at least one candidate user is a plurality of candidate users, the method further comprising:
determining a candidate user of the plurality of candidate users having a maximum score; and
identifying the user as the candidate user.

5. The method of claim 1, wherein for each of one or more user data fields of the plurality of user data fields, calculating the respective user data user field score comprises performing a fuzzy comparison of the one or more proposed values and the one or more reference values for the candidate user for the respective user data field.

6. The method of claim 5, wherein, for at least one of the one or more user data fields, performing the fuzzy comparison comprises performing one or more fuzzy text containment operations or one or more fuzzy text similarity operations.

7. The method of claim 5, wherein, for at least one of the one or more user data fields, performing the fuzzy comparison comprises performing one or more fuzzy temporal comparison operations.

8. The method of claim 1, wherein performing the one or more fuzzy logic operations comprises applying one or more Zadeh operators.

9. The method of claim 1, further comprising:
outputting, by way of an output, text or speech data corresponding to a request for information for a user data field.

10. The method of claim 1, wherein, for at least one user data field of the plurality of user data fields, the one or more hypotheses are a plurality of ordered hypotheses.

11. The method of claim 10, wherein calculating the respective user data field score for the at least one user data field comprises:
calculating a plurality of hypothesis scores, wherein the plurality of hypothesis scores comprise a respective value score for each of at least a subset of the plurality of hypotheses; and
performing one or more fuzzy logic operations on the plurality of hypothesis scores.

12. The method of claim 1, wherein calculating a respective user data field score comprises calculating a phonetic user data field score and an orthographic user data field score.

13. The method of claim 12, wherein deriving the one or more hypotheses comprises performing a grapheme to phoneme conversion.

14. The method of claim 12, wherein calculating a respective user data field score comprises applying a fuzzy logic operator to the phonetic user data field score and the orthographic user data field score.

15. The method of claim 12, wherein the fuzzy logic operator is a fuzzy OR operator.

16. The method of claim 1, wherein obtaining the input data comprises receiving input audio data from a user computing device, the method further comprising:
in response to verifying that the user is the candidate user, outputting a confirmation that an identity of the user has been verified to the user computing device.

17. The method of claim 1, wherein obtaining the input data comprises receiving input audio data from a user computing device, the method further comprising:
in response to identifying the user, outputting a confirmation that the user has been identified to the user computing device.

18. A non-transitory computer readable storage medium comprising computer readable code configured to cause a computer to perform the following dialogue method:
obtaining, by way of an input, input data relating to speech provided by a user;
deriving, from the input data relating to speech provided by a user, one or more hypotheses for each of a plurality of user data fields corresponding to knowledge based authentication factors, wherein deriving the one or more hypotheses comprises:
performing automatic speech recognition on the input data to generate text from the input data; and
determining, from the text generated, one or more proposed values for each of the plurality of user data fields,
wherein the one or more hypotheses comprise the one or more proposed values for each of the plurality of user data fields;
obtaining one or more reference values for each of the plurality of user data fields for each of one or more candidate users;
calculating a score for at least one candidate user of the one or more candidate users, calculating the score comprising:
calculating a plurality of user data field scores comprising, for each of the plurality of user data fields, a respective user data field score, by comparing the one or more hypotheses and the one or more reference values for the candidate user for the respective user data field;
performing one or more fuzzy logic operations on the plurality of user data field scores;
using the score for a candidate user of the one or more candidate users to perform a verification or identification process for the user;
verifying or identifying the user based on the verification or identification process using the score for the candidate user; and
providing, in response to verifying or identifying the user based on the verification or identification process using the score for the candidate user, access to an authenticated conversational system, the providing access to an authenticated conversational system comprising employing an authenticated interactive voice response (IVR) system to interact with the user.

19. A dialogue system, comprising one or more processors, the one or more processors configured to:

obtain, by way of an input, input data relating to speech provided by a user;

derive, from the input data relating to speech provided by a user, one or more hypotheses for each of a plurality of user data fields corresponding to knowledge based authentication factors, wherein deriving the one or more hypotheses comprises:

performing automatic speech recognition on the input data to generate text from the input data; and determining, from the text generated, one or more proposed values for each of the plurality of user data fields;

wherein the one or more hypotheses comprise the one or more proposed values for each of the plurality of user data fields;

obtain one or more reference values for each of the plurality of user data fields for each of one or more candidate users;

calculate a score for at least one candidate user of the one or more candidate users, calculating the score comprising:

calculating a plurality of user data field scores comprising, for each of the plurality of user data fields, a respective user data field score, by comparing the one or more hypotheses and the one or more reference values for the candidate user for the respective user data field;

performing one or more fuzzy logic operations on the plurality of user data field scores;

use the score for a candidate user of the one or more candidate users to perform a verification or identification process for the user;

verifying or identifying the user based on the verification or identification process using the score for the candidate user; and providing, in response to verifying or identifying the user based on the verification or identification process using the score for the candidate user, access to an authenticated conversational system, the providing access to an authenticated conversational system comprising employing an authenticated interactive voice response (IVR) system to interact with the user.

\* \* \* \* \*